United States Patent
Cherkasova

(10) Patent No.: US 7,523,217 B2
(45) Date of Patent: *Apr. 21, 2009

(54) SYSTEM AND METHOD HAVING IMPROVED EFFICIENCY AND RELIABILITY FOR DISTRIBUTING A FILE AMONG A PLURALITY OF RECIPIENTS

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

This patent is subject to a terminal disclaimer.

(21) Appl. No.: 10/619,737

(22) Filed: Jul. 15, 2003

(65) Prior Publication Data
US 2005/0015431 A1 Jan. 20, 2005

(51) Int. Cl.
*G06F 15/16* (2006.01)

(52) U.S. Cl. .................. 709/236; 709/217; 709/219; 709/231; 709/238; 709/248

(58) Field of Classification Search .......... 709/217, 709/219, 231, 236, 238, 248
See application file for complete search history.

(56) References Cited

U.S. PATENT DOCUMENTS

| | | | |
|---|---|---|---|
| 5,928,331 A | 7/1999 | Bushmitch | |
| 5,963,944 A | 10/1999 | Adams | |
| 6,205,445 B1 | 3/2001 | Tokuyama | |
| 6,230,251 B1 | 5/2001 | Batten et al. | |
| 6,233,252 B1 | 5/2001 | Barker et al. | |
| 6,253,185 B1 | 6/2001 | Arean et al. | |
| 6,269,080 B1 | 7/2001 | Kumar | |
| 6,330,370 B2 | 12/2001 | Goyal et al. | |
| 6,345,125 B2 | 2/2002 | Goyal et al. | |
| 6,397,251 B1 | 5/2002 | Graf | |
| 6,405,219 B2 | 6/2002 | Saether et al. | |
| 6,449,688 B1 | 9/2002 | Peters et al. | |
| 6,460,153 B1 | 10/2002 | Chou et al. | |
| 6,477,583 B1 * | 11/2002 | Zayas et al. | 709/248 |
| 6,493,877 B1 | 12/2002 | Yamazaki et al. | |
| 6,516,297 B1 | 2/2003 | Servetto et al. | |
| 6,970,939 B2 * | 11/2005 | Sim | 709/236 |

(Continued)

OTHER PUBLICATIONS

Byers, John et al., "Informed Content Delivery Across Adaptive Overlay Networks", Proc. of ACM SIGCOMM, 2002, pp. 1-14.

(Continued)

*Primary Examiner*—Yves Dalencourt

(57) ABSTRACT

A reliable system and method for distributing a file from a first node to a plurality of recipient nodes is provided. The method comprises attempting to distribute a plurality of subfiles that comprise a file from a first node to a first group comprising a plurality of recipient nodes, wherein the first node attempts to distribute at least one subfile to each recipient node of the first group but not all of the plurality of subfiles are distributed from the first node to any of the recipient nodes of the first group. The method further comprises detecting whether one of the plurality of recipient nodes of the first group has failed, and if a recipient node of the first group has failed, managing the distribution of the plurality of subfiles to detour their distribution around the failed node such that the file is distributed to each non-failed node of the plurality of recipient nodes.

28 Claims, 12 Drawing Sheets

U.S. PATENT DOCUMENTS

| | | |
|---|---|---|
| 2001/0040871 A1 | 11/2001 | Abrahamsson et al. |
| 2002/0083118 A1 | 6/2002 | Sim |
| 2002/0083187 A1 | 6/2002 | Sim et al. |
| 2003/0007515 A1 | 1/2003 | Apostolopoulos et al. |
| 2003/0009535 A1 | 1/2003 | Apostolopoulos et al. |
| 2003/0009578 A1 | 1/2003 | Apostolopoulos et al. |
| 2004/0088380 A1* | 5/2004 | Chung et al. ............... 709/219 |

OTHER PUBLICATIONS

U.S. Appl. No. 10/345,587, Cherkasova.
U.S. Appl. No. 10/345,716, Cherkasova.
U.S. Appl. No. 10/345,718, Cherkasova.
U.S. Appl. No. 10/345,719, Cherkasova.
U.S. Appl. No. 10/429,797, Cherkasova.
U.S. Appl. No. 10/619,805, Cherkasova.

* cited by examiner

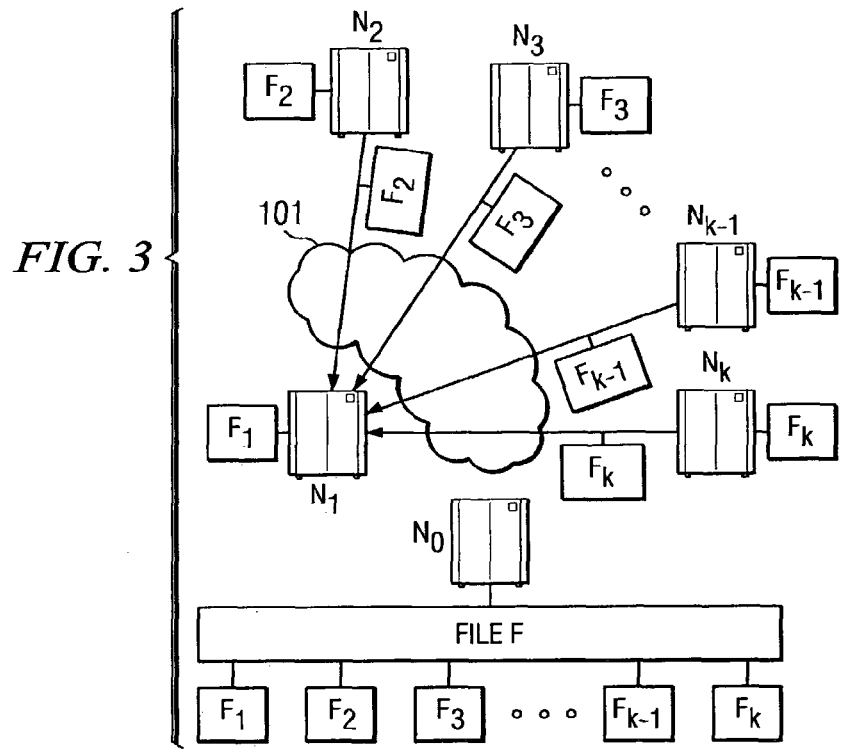
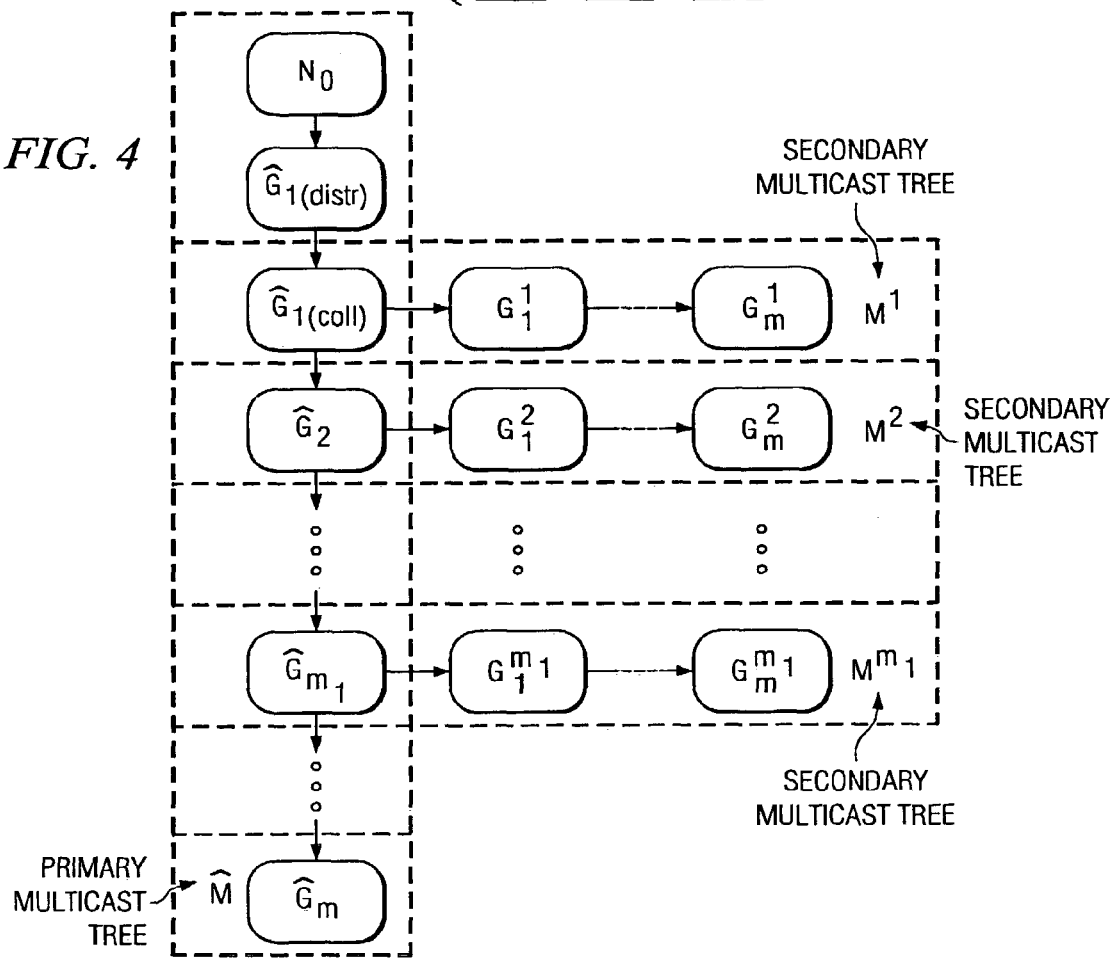
FIG. 3
FIG. 4

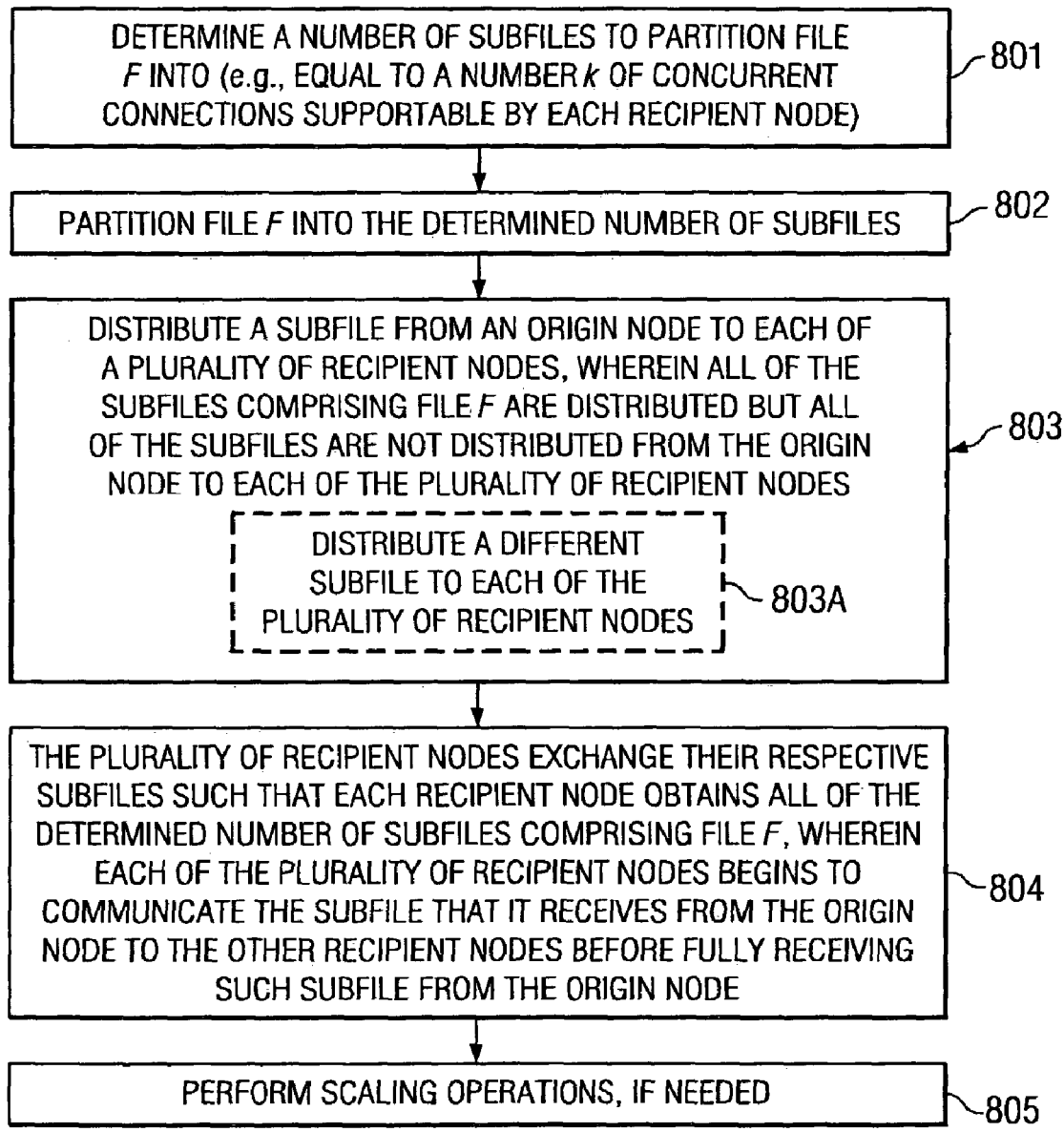

SYSTEM AND METHOD HAVING IMPROVED EFFICIENCY AND RELIABILITY FOR DISTRIBUTING A FILE AMONG A PLURALITY OF RECIPIENTS

CROSS-REFERENCE TO RELATED APPLICATIONS

This application is related to concurrently filed and commonly assigned U.S. patent application Ser. No. 10/619,805, filed Jul. 15, 2003 titled "SYSTEM AND METHOD HAVING IMPROVED EFFICIENCY FOR DISTRIBUTING A FILE AMONG A PLURALITY OF RECIPIENTS", which is now U.S. Pat. No. 7,349,906, the disclosure of which is hereby incorporated herein by reference. This application is also related to and commonly assigned U.S. patent application Ser. No. 10/345,716, filed Jan. 16, 2003, titled "SYSTEM AND METHOD FOR EFFICIENTLY REPLICATING A FILE AMONG A PLURALITY OF RECIPIENTS", which is now U.S. Pat. No. 7,174,334, and commonly assigned U.S. patent application Ser. No. 10/345,587, filed Jan. 16, 2003, titled "SYSTEM AND METHOD FOR EFFICIENTLY REPLICATING A FILE AMONG A PLURALITY OF RECIPIENTS IN A RELIABLE MANNER", which is still pending, and commonly assigned U.S. patent application Ser. No. 10,345,718, filed Jan. 16, 2003, titled "SYSTEM AND METHOD FOR EFFICIENTLY REPLICATING A FILE AMONG A PLURALITY OF RECIPIENTS HAVING IMPROVED SCALABILITY", which is now U.S. Pat. No. 7,200,598, and commonly assigned U.S. patent application Ser. No. 10/345,719, filed Jan. 16, 2003, titled "SYSTEM AND METHOD FOR EFFICIENTLY REPLICATING A FILE AMONG A PLURALITY OF RECIPIENTS HAVING IMPROVED SCALABILITY AND RELIABILITY", which is now U.S. Pat. No. 7,454,424, and commonly assigned U.S. patent application Ser. No. 10/429,797, filed May 5, 2003, titled "SYSTEM AND METHOD FOR EFFICIENT REPLICATION OF FILES ENCODED WITH MULTIPLE DESCRIPTION CODING", which is still pending, the disclosures of which are hereby incorporated herein by reference.

FIELD OF THE INVENTION

The present invention relates in general to file distribution, and more specifically to systems and methods for efficiently distributing a file from a first node to a plurality of recipient nodes in a scalable and reliable manner that accounts for node failures.

DESCRIPTION OF RELATED ART

Today, much information is stored as digital data. Such information is often available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an ever-increasing amount of information available to users via client-server networks.

It is often desirable to communicate information to a plurality of different recipients. More particularly, it is often desirable to replicate a large file among a number of distributed computers. For instance, in some situations it is desirable for a plurality of distributed clients to receive a replicated file. For example, suppose a number of client computers comprise a software application program, and the application program's provider makes a modification or update to the program. The application provider may desire to distribute the software update to each of the client computers. As another example, a company may receive a new software program and desire to distribute the software program to all of its computers that are communicatively coupled to the company's Local Area Network (LAN) or Intranet.

As still another example, it may be desirable for a large file to be replicated among a plurality of distributed servers. For instance, as described further below, a plurality of distributed servers may be established for efficiently serving content to clients (e.g., each server may be responsible for a particular geographical region of clients), and it may be desirable to replicate a file from an originating server to the other distributed servers such that all of the servers provide the same content to their respective clients. For example, Content Delivery Networks (CDNs) are based on a large-scale distributed network of servers located closer to the edges of the Internet for efficient delivery of digital content, including various forms of multimedia content. The main goal of the CDN's architecture is to minimize the network impact in the critical path of content delivery as well as to overcome a server overload problem, which is a serious threat for busy sites serving popular content. CDNs implementing distributed content servers are becoming increasingly popular on the Internet, and particularly within the World Wide Web (the "web") portion of the Internet, for example, for serving content (web documents) to clients. Many edge servers may be implemented within the Internet (e.g., hundreds, thousands, or even hundreds of thousands of edge servers may be implemented) that are each to serve the same, replicated content to their respective clients.

For many web documents (e.g., html pages and images having a relatively small file size) served via CDN, active replication of the original content at the edge servers may not be needed. The CDN's edge servers act as caching servers, and if the requested content is not yet in the cache at the time it is requested by a client, the content is retrieved from the original server using the so-called pull model. The performance penalty associated with the initial document retrieval from the original server to the edge server serving the requesting client, such as higher latency observed by the client and the additional load experienced by the original server, is generally not significant for small to medium size web documents.

For large files (e.g., large documents, software download packages, and media files), a different operational mode is typically preferred. In this case, it is typically desirable to replicate these files at edge servers in advance of a client requesting them, using the so-called push model. For large files, actively replicating the files to a plurality of distributed edge servers is a challenging, resource-intensive problem, e.g., streaming media files can require significant bandwidth and download time due to their large sizes: a 20 minute streaming media file encoded at 1 Mbit/s results in a file of 150 Mbytes. Thus, if such a large file was not actively replicated to the edge servers in advance of a client requesting the file, a significant performance penalty may be incurred for retrieving the file from the original server, such as higher latency observed by the client and the additional load experienced by the original server in providing the large file to the edge server serving the requesting client. Sites supported for efficiency reasons by multiple mirror servers face a similar problem: the original content needs to be replicated across the multiple, geographically distributed, mirror servers.

BRIEF SUMMARY OF THE INVENTION

In certain embodiments of the present invention, a method of distributing a file from a first node to a plurality of recipient nodes is provided. The method comprises partitioning a file F into a plurality of subfiles. The method further includes performing distribution of the file F to a plurality of recipient nodes using a distribution technique that comprises (a) attempting to distribute the plurality of sub files from a first node to a first group of recipient nodes, wherein the first node attempts to communicate at least one subfile to each recipient node of the first group but not all of the plurality of subfiles to any recipient node of the first group, and (b) the plurality of recipient nodes of the first group attempting to exchange their respective sub files received from the first node, wherein at least one recipient node of the first group begins communicating a portion of its respective sub file that it is receiving from the first node to at least one other recipient node of the first group before the at least one recipient node fully receives its respective subfile. The method further comprises detecting a failed node of the plurality of recipient nodes, and the distribution technique adapting to distribute all of the subfiles of the file F to each non-failed node of the plurality of recipient nodes.

In certain embodiments, a system comprises an origin node operable to partition a file F into a plurality of subfiles, wherein the plurality of subfiles correspond in number to a number of recipient nodes in a first group to which the file is to be distributed. The origin node is operable to attempt to distribute all of the plurality of subfiles to the recipient nodes, wherein the origin node attempts to distribute a different one of the plurality of subfiles to each of the recipient nodes. The recipient nodes are operable to attempt to exchange their respective subfiles received from the origin node such that each recipient node obtains all of the plurality of subfiles, wherein at least one recipient node of the first group begins communicating a portion of its respective sub file that it is receiving from the origin node to at least one other recipient node of the first group before the at least one recipient node fully receives its respective subfile from the origin node. The origin node is operable to detect a failed node in the first group, and the origin node is operable to manage distribution of the file F upon detecting a failed node in the first group in a manner such that every non-failed node of the first group receives the file F.

In certain embodiments, a method of distributing a file from a first node to a plurality of recipient nodes comprises attempting to distribute a plurality of subfiles that comprise a file from a first node to a first group comprising a plurality of recipient nodes, wherein the first node attempts to distribute at least one subfile to each recipient node of the first group but not all of the plurality of subfiles are distributed from the first node to any of the recipient nodes of the first group. The method further comprises the plurality of recipient nodes of the first group attempting to exchange their respective subfiles, wherein at least one recipient node of the first group begins communicating a portion of its respective subfile that it is receiving from the first node to at least one other recipient node of the first group before the at least one recipient node fully receives its respective subfile. The method further comprises detecting whether one of the plurality of recipient nodes of the first group has failed, and if a recipient node of the first group has failed, managing the distribution of the plurality of subfiles to detour their distribution around the failed node such that file F is distributed to each non-failed node of the plurality of recipient nodes.

BRIEF DESCRIPTION OF THE DRAWINGS

FIG. 3 shows an example of a recipient node receiving subfiles from each of the other recipient nodes in accordance with the file distribution technique of FIG. 1;

FIG. 4 shows an example of logically arranging a plurality of replication groups of recipient nodes into primary and secondary multicast trees in accordance with an embodiment of the present invention;

FIG. 8 shows an example operational flow diagram for distributing a file from an origin node to a plurality of recipient nodes in accordance with an embodiment of the present invention;

DETAILED DESCRIPTION

Figure 1:
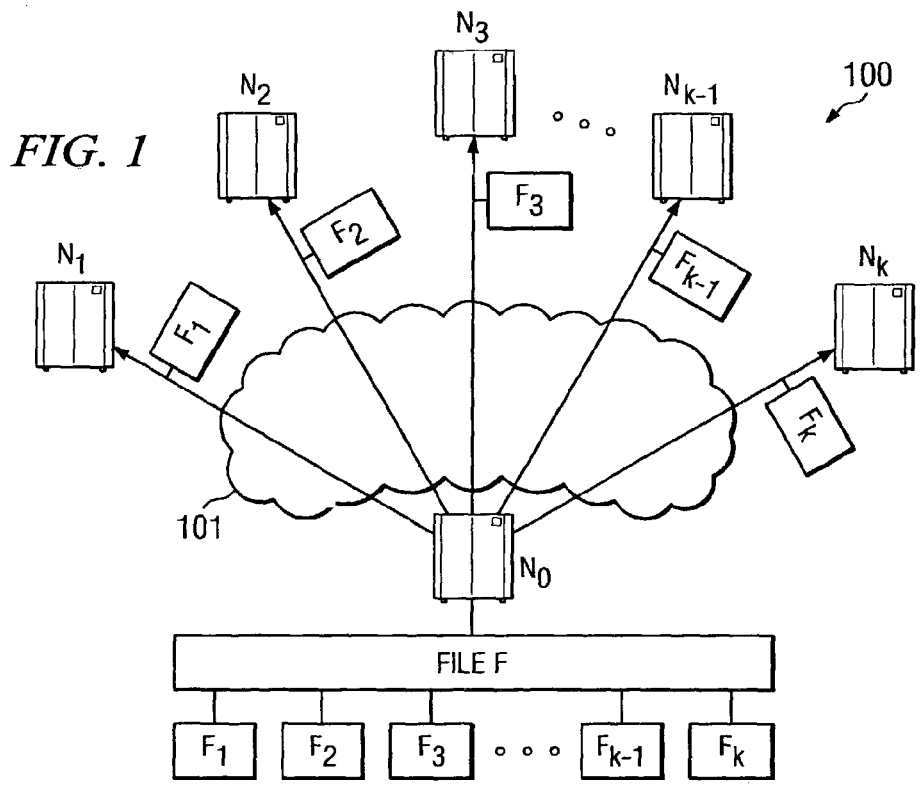
FIG. 1 shows an example environment in which embodiments of the present invention may be utilized and illustrates an example of distributing subfiles from an origin node to a plurality of recipient nodes in accordance with a file distribution technique of an embodiment of the present invention.

Various embodiments of the present invention are now described with reference to the above figures, wherein like reference numerals represent like parts throughout the several views. As described further below, embodiments of the present invention provide a system and method for distributing a file from a first node (which may be referred to herein as the "origin" node) to a plurality of recipient nodes. In certain embodiments, the plurality of recipient nodes comprise servers, such as edge servers in a CDN or mirror servers as examples. Of course, embodiments of the present invention may also be utilized for distributing a file to client nodes.

According to an embodiment of the present invention, a file distribution technique is provided that is scalable for application in distributing a file to a very large number of recipient nodes. For instance, embodiments of the present invention enable the recipient nodes to be logically organized into a plurality of different groups, with each group having a plurality of recipient nodes, and a file is efficiently distributed to the plurality of groups of recipient nodes.

According to certain embodiments, a file is partitioned into a plurality of parts (or "subfiles"), and the plurality of parts are distributed from the origin node to the recipient nodes. More particularly, all of the subfiles comprising the file to be distributed are communicated from an origin node to the recipient nodes, but the origin node does not send all of the subfiles to each recipient node. That is, the origin node sends only a portion of the subfiles that comprise the file to be distributed to each recipient node. For instance, in one embodiment, each recipient node receives a different one of the subfiles of the file to be distributed.

Further, the recipients exchange their respective subfiles with each other, thus resulting in each recipient obtaining the full file. More specifically, in accordance with embodiments of the present invention, at least one of the recipient nodes begins communicating its respective subfile that it is receiving from the origin node to other recipient nodes before the at least one recipient node receives the full subfile from the origin node. In certain embodiments, the nodes may exchange their respective subfiles in a manner such that they each begin to communicate a portion of their respective subfiles to the other recipient nodes before the full subfile is received from the origin node. Thus, in accordance with embodiments of the present invention, the recipient-nodes may begin communicating portion(s) (e.g., packets) of their respective subfiles to other recipient nodes before their respective subfile is fully received from the origin node.

In view of the above, certain embodiments of the present invention provide a distribution technique in which the origin node is not required to communicate the full file to each recipient node, but rather may communicate only a portion thereof to each recipient node, and the recipient nodes exchange their respective portions to result in each recipient node obtaining all subfiles comprising the full file. Further, the recipient nodes may begin communicating portion(s) (e.g., packets) of their respective subfiles to other recipient nodes before their respective subfiles are fully received from the origin node. That is, the exchange of subfiles between the recipient nodes may be performed concurrently with the communication of the respective subfiles from the origin node to the recipient nodes. Accordingly, an efficient distribution of the file among the plurality of nodes is enabled.

Various techniques may be implemented for distributing a file from an origin node to a plurality of recipient nodes in accordance with embodiments of the present invention. Certain embodiments of the present invention implement a technique referred to herein as the Application-Level Multicast (ALM)-FastReplica distribution technique. With ALM-FastReplica, to replicate a large file F among a total of n recipient nodes, the recipient nodes may be logically grouped into "replication groups" that each have k nodes (or that each have no more than k nodes). As described further below, the value of k may be determined as a function of the maximum number of concurrent communication connections that each node to which the file F is to be distributed can support. The original file F may be partitioned into k subfiles of approximately equal size, and each subfile is communicated from the origin node to a different recipient node of a first replication group. That is, the subfiles are communicated to the recipient nodes of a first replication group from the origin node concurrently. Such communication of the subfiles from the origin node to the recipient nodes is referred to herein as a "distribution" step.

Further, each recipient node propagates its respective subfile (i.e., the subfile that it receives from the origin node) to the remaining recipient nodes of its respective replication group. That is, each recipient node concurrently communicates its subfile to the other nodes of the replication group. This exchange of subfiles by recipient nodes is referred to herein as a "collection" step, as the recipient nodes of a replication group each collect the subfiles comprising file F from the other recipient nodes of the replication group. In accordance with embodiments of the present invention, the recipient nodes may begin communicating portion(s) of their respective subfiles to other recipient nodes before the entire subfile is received from the origin node. For instance, a first recipient node may receive a first subfile $F_1$ of file F from an origin node, and such first recipient node may communicate the first subfile $F_1$ to other recipient nodes of its respective replication group. Such first recipient node may begin communicating the first subfile $F_1$ to other recipient nodes of its respective replication group before the first recipient node receives all of the first subfile $F_1$ from the origin node. For example, while the first recipient node has a communication connection established with the origin node, through which the first recipient node is receiving packets of subfile $F_1$, the first recipient node may establish concurrent communication connections to the other recipient nodes of its respective replication group and begin communicating the received packets of subfile $F_1$ to the other recipient nodes before all packets of subfile $F_1$ are received by the first recipient node. In certain embodiments, the first recipient node may forward the packets of subfile $F_1$ to the other nodes of its replication group as the packets are received by the first recipient node from the origin node. Thus, the above-described distribution and collection steps may effectively be performed concurrently in certain embodiments of the present invention. Additionally, as described further below, if there is more than one replication group, the file may be further communicated to other replication groups. In certain embodiments, a recipient node of a first replication group may begin communicating a subfile that it is receiving from an origin node to a recipient node of a second replication group before the recipient node of the first replication group receives the full subfile from the origin node.

Embodiments of the present invention improve the robustness (or "reliability") of the above file distribution process to deal with node failures. As can be seen from the above description of ALM-FastReplica, for example, such ALM-FastReplica algorithm is sensitive to node failures. For example, if a node of a group fails during the collection step for the group, this event may impact all other nodes in such distribution group because each node depends on the other nodes of the group to receive the other nodes' respective subfiles. Embodiments of the present invention enable reliable distribution of a file to recipient nodes even if node failures are encountered. More particularly, techniques for detecting a node failure and detouring the distribution of the subfiles around such failed node are provided in an embodiment of the present invention.

To better appreciate aspects of embodiments of the present invention, it is appropriate to briefly review the existing techniques in the art for file distribution. Currently, the three most popular methods used for content distribution (or file "replication") in the Internet environment are: (1) satellite distribution, (2) multicast distribution, and (3) application-level multicast distribution.

With satellite distribution, the content distribution server (or the "origin node") has a transmitting antenna. The servers (or "recipient nodes") to which the content should be replicated (or the corresponding Internet Data centers, where the servers are located) have a satellite receiving dish. The original content distribution server broadcasts a file via a satellite channel. Among the shortcomings of the satellite distribution method are that it requires special hardware deployment and the supporting infrastructure (or service) is quite expensive.

With multicast distribution, such as "IP Multicast" distribution, an application can send one copy of each packet of a file and address it to the group of recipient nodes (IP addresses) that want to receive it. This technique reduces network traffic by simultaneously delivering a single stream of information to hundreds/thousands of interested recipients. Multicast can be implemented at both the data-link layer and the network layer. Applications that take advantage of multicast technologies include video conferencing, corporate communications, distance learning, and distribution of software, stock quotes, and news. Among the shortcomings of the multicast distribution method is that it requires a multicast support in routers, which still is not consistently available across the Internet infrastructure.

Since the native IP multicast has not received widespread deployment, many industrial and research efforts have shifted to investigating and deploying "application-level multicast," where nodes across the Internet act as intermediate routers to efficiently distribute content along a predefined mesh or tree. A growing number of researchers have advocated this alternative approach, where all multicast related functionality, including group management and packet replication, is implemented at end systems. In this architecture, nodes participating in the multicast group self-organize themselves into a scalable overlay structure using a distributed protocol. Further, the nodes attempt to optimize the efficiency of the overlay by adapting to changing network conditions and considering the application-level requirements.

An extension for the end-system multicast is introduced by J. Byers, J. Considine, and M. Mitzenmacher in "Informed Content Delivery Across Adaptive Overlay Networks", *Proc. Of ACM SIGCOMM,* 2002, in which instead of using the end systems as routers forwarding the packets, the authors propose that the end-systems actively collaborate in an informed manner to improve the performance of large file distribution. The main idea is to overcome the limitation of the traditional service models based on tree topologies where the transfer rate to the client is defined by the bandwidth of the bottleneck link of the communication path from the origin server. The authors propose to use additional cross-connections between the end-systems to exchange the complementary content these nodes have already received. Assuming that any given pair of end-systems has not received exactly the same content, these cross-connections between the end-systems can be used to "reconcile" the differences in received content in order to reduce the total transfer time.

As mentioned above, certain embodiments of the present invention may implement a distribution technique referred to herein as the ALM-FastReplica distribution technique. As with the above-described application-level multicast approaches proposed in the existing art, implementations of such ALM-FastReplica distribution technique use the end nodes for packet replication. In accordance with embodiments of the present invention, the ALM-FastReplica distribution technique provides a technique for efficiently distributing a file among a plurality of nodes (e.g., by distributing a file in a manner that efficiently utilizes communication paths available between the nodes). Example embodiments implementing such ALM-FastReplica technique are described further below.

Consider the following notations:
(a) Let $N_0$ be a node (which may be referred to as an "origin node" or "origin server") which has an original file F, and let Size(F) denote the size of file F in bytes; and
(b) Let $R=\{N_1, \ldots, N_n\}$ be a replication set of nodes (i.e., a set of recipient nodes to which the file F is to be distributed).

The problem becomes replicating file F across nodes $N_1, \ldots, N_n$, while minimizing the overall replication time.

In accordance with certain embodiments, let k be a function of the maximum number of concurrent connections that each node can support. As an example, in one embodiment described further below, k is equal to the maximum number of concurrent connections that each node can support (which is typically 30 or less). In another example embodiment described further below, k+1 is the maximum number of concurrent connections that each node can support. In a further example embodiment described below, k+2 is the maximum number of concurrent connections that each node can support. Thus, in certain embodiments, k may be a number of network connections chosen for concurrent transfers between a single node and multiple recipient nodes. If n>k, then the original set R of n nodes to which file F is to be distributed are partitioned into-replication groups that each have k nodes. Further, file F is divided into k subsequent subfiles $\{F_1, \ldots, F_k\}$ that are each approximately of equal size.

In one implementation of this ALM-FastReplica technique, file F is divided into k equal subsequent subfiles: $F_1, \ldots, F_k$, where $$Size(F_i) = \frac{Size(F)}{k}$$

bytes for each i: $1 \leq i \leq k$. The ALM-FastReplica algorithm then performs a distribution step in which origin node $N_0$ opens k concurrent network connections to nodes $N_1, \ldots, N_k$ of a first replication group, and sends to each recipient node $N_i$ ($1 \leq i \leq k$) the following items:
(a) a distribution list of nodes $R=\{N_1, \ldots, N_k\}$ to which subfile $F_i$ is to be sent during the collection step (each node $N_i$ is itself excluded from its distribution list); and
(b) subfile $F_i$.

An example of this distribution step of the ALM-FastReplica algorithm is shown in FIG. 1. For instance, FIG. 1 shows an example environment 100 in which embodiments of the present invention may be utilized. Environment 100 comprises origin node $N_0$ and recipient nodes $N_1, N_2, N_3, \ldots, N_{k-1}, N_k$ that are communicatively coupled via communication network 101. Communication network 101 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other. In certain embodiments, nodes $N_0$-$N_k$ comprise server computers. For instance, nodes $N_1, \ldots, N_k$ may comprise edge servers in a CDN or mirror servers within a mirrored network. In other embodiments, nodes $N_0$-$N_k$ may comprise server and/or client computers. For example, node $N_0$ may comprise a server computer, and nodes $N_1, \ldots, N_k$ may comprise client computers to receive a file (e.g., software application file, etc.) from node $N_0$.

Origin node $N_0$ comprises file F stored thereto, and such file F is partitioned into k subfiles $F_1, F_2, F_3, \ldots, F_{k-1}, F_k$, wherein the sum of subfiles $F_1, F_2, F_3, \ldots, F_{k-1}, F_k$ comprises the total file F. As shown, the plurality of subfiles are distributed from origin node $N_0$ to the recipient nodes $N_1, \ldots, N_k$. More particularly, all of the k subfiles comprising file F are communicated from origin node $N_0$ to the recipient nodes $N_1, \ldots, N_k$, but origin node $N_0$ does not send all of the k sub files to each recipient node. That is, origin node $N_0$ sends only a portion of the k subfiles to each recipient node. For instance, in this example, each recipient node receives a different one of the k subfiles from origin node $N_0$. More particularly, origin node $N_0$ communicates subfile $F_1$ to node $N_1$, subfile $F_2$ to node $N_2$, subfile $F_3$ to node $N_3, \ldots$, subfile $F_{k-1}$ to node $N_{k-1}$, and subfile $F_k$ to node $N_k$ via communication network 101. Additionally, in an embodiment of the present invention, origin node $N_0$ also sends a distribution list to each recipient node $N_1, \ldots, N_k$. The distribution list for each node identifies the other recipient nodes that such recipient node is to communicate the subfile that it receives from origin node $N_0$. For example, origin node $N_0$ may send to node $N_1$ a distribution list identifying nodes $N_2, \ldots, N_k$. Similarly, origin node $N_0$ may send to node $N_2$ a distribution list identifying nodes $N_1$, and $N_3, \ldots, N_k$, and soon.

Figure 2:
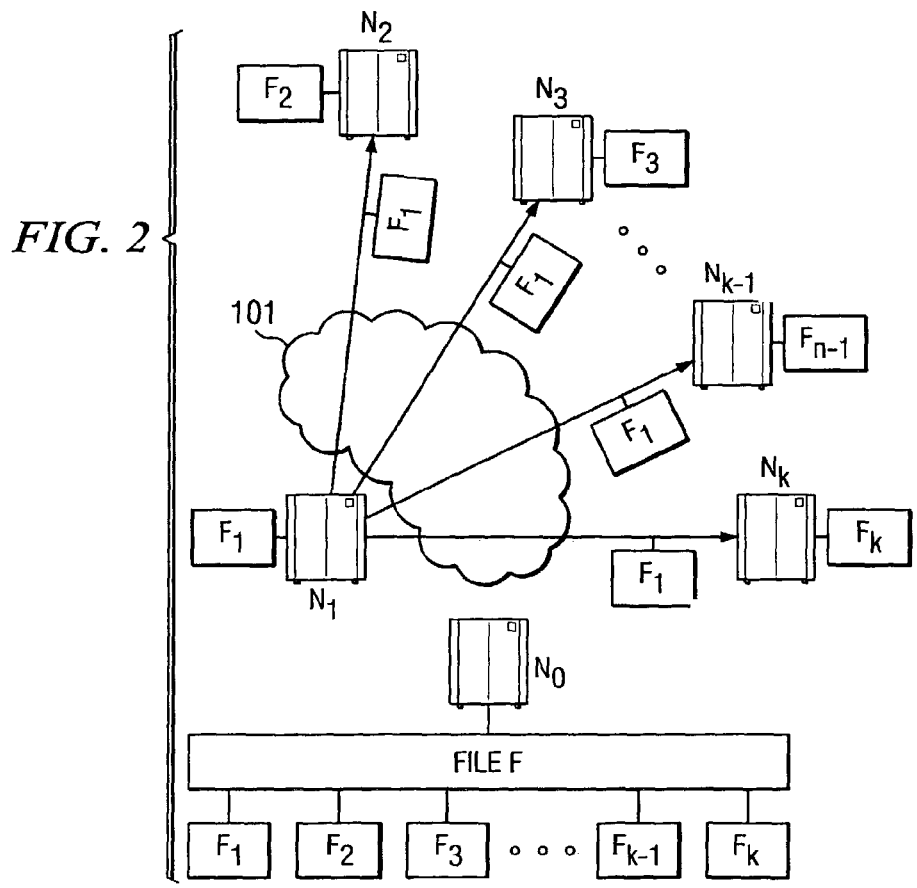
FIG. 2 shows an example of a recipient node communicating the subfile that it received from an origin node to other recipient nodes in accordance with the file distribution technique of FIG. 1.

The ALM-FastReplica algorithm also performs a collection step. An example of the collection step is described herein in conjunction with FIGS. 2 and 3. After receiving at least a portion of file $F_i$ (e.g., at least a first packet thereof), node $N_i$ opens (k−1) concurrent network connections to remaining nodes in the recipient group and sends the received portion of subfile $F_i$ to them, as shown in FIG. 2 for node $N_1$. More particularly, FIG. 2 shows that node $N_1$ opens k−1 concurrent network connections, i.e., one network connection with each of recipient nodes $N_2, \ldots, N_k$. Node $N_1$ communicates subfile $F_1$, which it receives from origin node $N_0$ in the above-described distribution step, to each of the recipient nodes $N_2, \ldots, N_k$. As described further below, node $N_1$ may begin communicating a portion of subfile $F_1$ to the other recipient nodes $N_2, \ldots, N_k$ before node $N_1$ receives all of subfile $F_1$ from origin node $N_0$. For instance, when implemented in a packet-switched network, node $N_1$ may begin communicating packets of subfile $F_1$ to the other recipient nodes $N_2, \ldots, N_k$ before node $N_1$ receives all packets of subfile $F_1$ from origin node $N_0$. In certain implementations, node $N_1$ may communicate packets of subfile $F_1$, to the other recipient nodes $N_2, \ldots, N_k$ as those packets are received by node $N_1$ from origin node $N_0$.

Similarly, FIG. 3 shows the set of incoming, concurrent connections to node $N_1$ from the remaining recipient nodes $N_2, \ldots, N_k$, transferring the complementary sub files $F_2, \ldots, F_k$ during the collection step of the ALM-FastReplica algorithm. More particularly, FIG. 3 shows that node $N_1$, has k−1 concurrent network connections, i.e., one network connection with each of recipient nodes $N_2, \ldots, N_k$ through which node $N_1$ receives the other subfiles comprising file F from the recipient nodes $N_2, \ldots, N_k$. That is, each of recipient nodes $N_2, \ldots, N_k$ communicates its respective subfile that it receives from origin node $N_0$. As described further below, each of nodes $N_2, \ldots, N_k$ may begin communicating received portions of their respective subfiles, $F_2, \ldots, F_k$ to the other recipient nodes (e.g., as shown with node $N_1$ in FIG. 3) before such nodes $N_2, \ldots, N_k$ receive all of their respective subfile from origin node $N_0$. Thus, the distribution step of FIG. 1 and the collection steps of FIGS. 2 and 3 may be effectively performed concurrently.

Accordingly, during the distribution and collection operations, each node $N_i$ may have the following set of network connections:

(a) there are k−1 outgoing connections from node $N_i$: one connection to each node $N_j$ (j≠i) of the replication group for sending the corresponding subfile $F_i$ to node $N_j$; and (b) there are k incoming connections to node $N_i$: one connection from each node $N_j$ (j≠i) of the replication group for sending the corresponding subfile $F_j$ to node $N_i$ in addition to the connection from origin node $N_0$ to node $N_i$ for sending subfile $F_i$ to node $N_i$.

Thus, at the end of the above distribution and collection operations, each recipient node receives all subfiles $F_1, \ldots, F_k$ comprising the entire original file F. Accordingly, each of the nodes in the first replication group obtain the full file F (which is reconstructed through the received subfiles). Additionally, if additional replication groups exist, the file nay be further communicated to such additional replication groups (e.g., as described further below) such that the entire set R of recipient nodes n obtain the full file F. An example embodiment of the ALM-FastReplica distribution technique is described further below in conjunction with FIGS. 4-9B.

In accordance with an example embodiment, again let k be a number of network connections chosen for concurrent transfers between a single node and multiple recipient nodes. If the total number of nodes n to which file F is to be distributed is greater than k (i.e., n>k), then the original set R of n nodes are partitioned into replication groups that each have k nodes. Let $G_1, \ldots, G_{k_1}$ be the corresponding replication groups. Further, file F is divided into k subsequent subfiles $\{F_1, \ldots, F_k\}$ that are each approximately of equal size.

Let m be a number of groups comprising a multicast tree. According to previous studies (see e.g., Y. Chu, S. Rao, S. Seshan, H. Z hang, "Enabling conferencing applications on the Internet using an overlay multicast architecture", *Proc. of ACM SIGCOMM,* 2001), a reasonable value of m may vary in a range of several 10s of nodes, for example. Then replication groups $G_1, \ldots, G_k$ may be arranged in the special multicast trees $\hat{M}, M^1, \ldots, M^{m_1}$ each having m (or less) groups, where $\hat{M}$ is referred to as a "primary" multicast tree, and $M^1, \ldots, M^{m_1}$ are referred to as "secondary" multicast trees. FIG. 4 shows an example of a plurality of replication groups $G_1, \ldots, G_{k_1}$ that are arranged in such multicast trees $\hat{M}, M^1, \ldots, M^{m_1}$.

A primary multicast tree, $\hat{M}$, comprises replication groups in which a portion of a subfile begins being communicated to at least one node thereof from a node of another replication group before the node of such other replication group fully receives the subfile. For instance, in the example of FIG. 4, primary multicast tree $\hat{M}$ comprises origin node $N_0$ and replication groups $\hat{G}_1, \hat{G}_2, \ldots, \hat{G}_m$. At least one recipient node of group $\hat{G}_1$ is operable to begin communicating its respective subfile that it is receiving from origin node $N_0$ to at least one recipient node of group $\hat{G}_2$ before such at least one node of group $\hat{G}_1$ receives the entire subfile from origin node $N_0$.

A secondary multicast tree, such as secondary multicast trees $M^1, \ldots, M^{m_1}$ of the example of FIG. 4, comprises at least one replication group in which a portion of a subfile begins being communicated to a node thereof from a node of another replication group after the node of such other replication group fully receives the subfile. For instance, in the example of FIG. 4, secondary multicast tree $M^1$ comprises replication groups $G_1^1, G_2^1, \ldots, G_m^1$. In this example, the recipient nodes of group $\hat{G}_1$ are operable to begin communicating their respective subfiles that they receive from origin node $N_0$ to at least one recipient node of group $G_1^1$ of secondary tree $M^1$ after such recipient nodes of group $\hat{G}_1$ fully receive their respective subfiles from origin node $N_0$. For instance, after a first node of group $\hat{G}_1$, fully receives its respective subfile from origin node $N_0$, it may terminate its communication connection with origin node $N_0$ and replace such terminated communication connection with a communication connection to a node of group $G_1^1$ of secondary tree $M^1$, and the first node may then begin transferring its respective subfile that it received from origin node $N_0$ to the node of $G_1^1$. The nodes of group $G_1^1$ of secondary tree $M^1$ may each begin communicating the subfiles that they are receiving from the nodes of group $\hat{G}_1$ to at least one node of a second group $G_2^1$ before fully receiving their respective subfiles. That is, the nodes of group $G_1^1$ of secondary tree $M^1$ may forward their respective subfiles that they are receiving from the nodes of group $\hat{G}_1$ to the nodes of the next group of the secondary tree $M^1$, and so on, such that the file F is distributed through the replication groups of the secondary tree in much the same manner as distributed through the primary tree.

To achieve the best performance results, the values m and $m_1$ (i.e., the number, m, of groups included in each multicast tree versus the number, $m_1$, of multicast trees) should preferably be similar: this will lead to well-balanced multicast trees. Depending on the number of nodes, n, in the original replication set R, the example ALM-FastReplica algorithm may utilize only a primary multicast tree in certain situations and it may also employ secondary multicast trees in other situations. That is, depending on the number of nodes n to which file F is to be distributed, in certain situations it may be more efficient to utilize only a primary multicast tree, and in other situations it may be more efficient to further utilize secondary multicast trees for the distribution.

In operation, the example ALM-FastReplica algorithm of FIG. 4, first replicates file F via the primary multicast tree $\hat{M}$. Once groups $\hat{G}_1, \ldots, \hat{G}_m$ comprising the primary multicast tree $\hat{M}$, receive subfiles $F_1, \ldots, F_k$, they initiate (independently from each other) communication of subfiles $F_1, \ldots, F_k$ to the secondary multicast trees $M^1, \ldots, M^{m_1}$.

More specifically, the distribution of file F through the primary multicast tree $\hat{M}$ in accordance with an example embodiment of the ALM-FastReplica algorithm is as follows. Let groups $\hat{G}_1, \ldots, \hat{G}_m$ comprise the primary multicast tree $\hat{M}$, as shown in FIG. 4. Let $\hat{G}_i = \{N_1^i, \ldots, N_k^i\}$, $1 \leq i \leq m$. The distribution within the primary multicast tree $\hat{M}$ of one embodiment comprises performing a distribution step and a collection step, as described below, and it may further comprise a group communication step, as also described below, if more than one replication group is included in the primary multicast tree.

In the distribution step of this example embodiment, originator node $N_0$ opens k concurrent network connections to nodes $N_1^1, \ldots, N_k^1$ of replication group $\hat{G}_1$, and starts sending subfile $F_i$ to the corresponding recipient node $N_i^1 1 \leq i \leq m$. This step is represented by box $\hat{G}_1$ (distr) in FIG. 4. In the collection step of this example embodiment, in group $\hat{G}_1$ each node $N_i^1$, after receiving the first bytes of file $F_i$, immediately starts sending the file $F_i$ to the rest of the nodes in group $\hat{G}_1$ This type of forwarding in which portions (e.g., packets) of file $F_i$ are immediately forwarded from the recipient node to other nodes of a replication group as soon as such portions are received by the recipient node (e.g., from the origin node) may be referred to herein as a "fast-forward" mode of distribution. In this collection step, each node in group $\hat{G}_1$ will be receiving all subfiles $F_1, \ldots, F_k$ of original file F. This step is represented by box $\hat{G}_1$ (coll) in FIG. 4. It should be understood that while the distribution and collection steps are shown in FIG. 4 as sequential boxes $\hat{G}_1$ (distr) and $\hat{G}_1$ (coll), as described above these operations are effectively performed concurrently.

Figure 5:
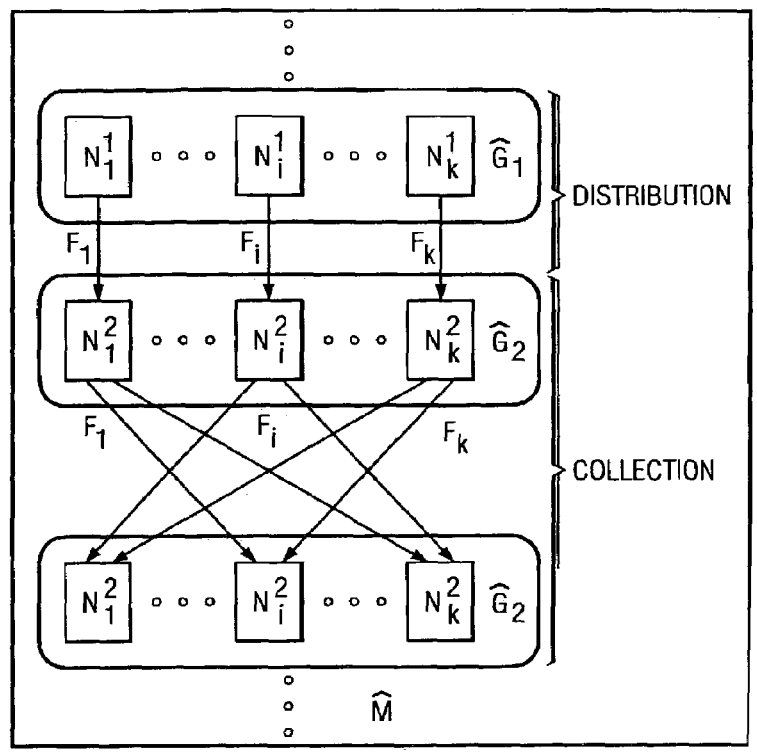
FIG. 5 shows an example communication pattern utilized between a first and second replication group of a primary multicast tree in accordance with the example embodiment of FIG. 4.

If, as in the example of FIG. 4, further replication groups exist in the primary multicast tree, then a group communication step is performed in this example embodiment. Thus, for instance, a first replication group, $\hat{G}_1$, distributes file F to a second replication group, $\hat{G}_2$, of the primary multicast tree $\hat{M}$. Communication between groups $\hat{G}_1$ and $\hat{G}_2$ follows a different file exchange protocol, defining another communication pattern actively used in this example embodiment of the ALM-FastReplica algorithm. The communication pattern utilized between groups $\hat{G}_1$ and $\hat{G}_2$ in accordance with this example embodiment is shown in FIG. 5. As shown in FIG. 5, each node $N_i^1$ of group $\hat{G}_1$, after receiving first bytes of subfile $F_i$, immediately starts sending the subfile $F_i$ to node $N_i^2$ of group $\hat{G}_2$. Thus, while the nodes of group $\hat{G}_1$ are performing the distribution and collection steps within such group, each node also concurrently establishes a communication connection to a node of group $\hat{G}_2$. Accordingly, not only does each node of group $\hat{G}_1$ forward the received portions of its respective subfile to the other nodes of group $\hat{G}_1$, but it also forwards the received portions of its respective subfile to a node of group $\hat{G}_2$. That is, before receiving the full subfile from the origin node, a recipient node of group $\hat{G}_1$ begins communicating such subfile to a corresponding node of group $\hat{G}_2$ (in a fast-forward mode of distribution). As shown in FIG. 5, such communication of subfiles from the nodes of group $\hat{G}_1$ to the nodes of group $\hat{G}_2$ is effectively a distribution step.

As further shown in FIG. 5, the nodes of group $\hat{G}_2$ may begin performing the collection step described above, wherein each node $N_1^2, N_2^2, \ldots, N_k^2$ of group $\hat{G}_2$ opens k−1 concurrent communication connections to the rest of the nodes of group $\hat{G}_2$ for transferring its respective subfile $F_i$ (i.e., the subfile that the node received from group $\hat{G}_1$). More specifically, each node of group $\hat{G}_2$ may begin distributing to the other nodes of group $\hat{G}_2$ its respective subfile that it is receiving from a node of group $\hat{G}_1$ before fully receiving such subfile. That is, the nodes of group $\hat{G}_2$ may use a fast-forward mode to perform the collection step concurrently with the distribution step of FIG. 5. In this way, each node of group $\hat{G}_2$ will be receiving all subfiles $F_1, \ldots, F_k$ of the original file F.

Similarly, group $\hat{G}_2$ may start communications with a next group $\hat{G}_3$ (not shown in FIG. 5) using the group communication step immediately after node $N_i^2$ receives the first bytes of file $F_i$. That is, each node $N_i^2$ of group $\hat{G}_2$, after receiving first bytes of subfile $F_i$, immediately starts sending the subfile $F_i$ to node $N_i^3$ of group $\hat{G}_3$. Thus, while the nodes of group $\hat{G}_2$ are performing the distribution and collection steps within such group, each node also concurrently establishes a communication connection to a node of group $\hat{G}_3$. Accordingly, not only does each node of group $\hat{G}_2$ forward the received portions of its respective subfile to the other nodes of group $\hat{G}_2$, but it also forwards the received portions of its respective subfile to a node of group $\hat{G}_3$. This replication procedure continues unrolling through the set of corresponding groups in primary multicast tree $\hat{M}$ shown in FIG. 4. Thus, the groups of the primary multicast tree $\hat{M}$ may before group communication in a fast-forward mode of distribution.

Figure 6:
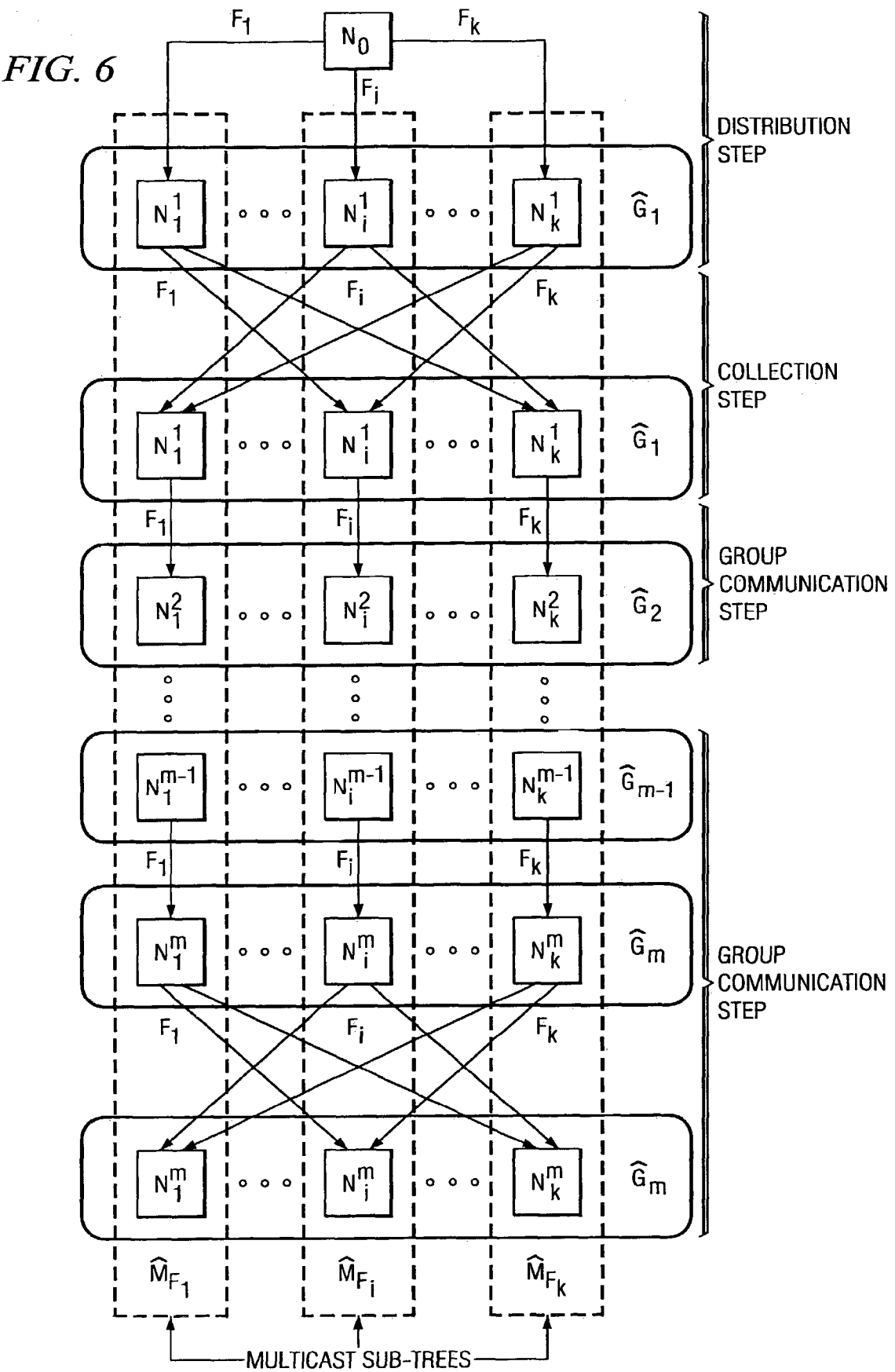
FIG. 6 shows an example of a fast-forward mode of distribution between replication groups of a primary multicast tree in accordance with the example embodiment of FIG. 4.

An example of such fast-forward distribution between replication groups of a primary multicast tree is shown further in FIG. 6. As shown, the primary multicast tree $\hat{M}$ is a collection of k multicast sub-trees $\hat{M}_{F_1}, \hat{M}_{F_2}, \ldots, \hat{M}_{F_k}$, where each such sub-tree $\hat{M}_{F_i}$ is replicating the corresponding subfile $F_i$. At the same time, nodes from these different multicast sub-trees use additional cross-connections between their nodes (as shown in FIG. 6) to exchange their complementary subfiles.

As shown in FIG. 4, in some implementations, secondary multicast trees may also be utilized for distribution, such as secondary multicast trees $M^1, \ldots, M^{m_1}$. Each replication group $\hat{G}_i(1 \leq i \leq m_1)$ of the primary multicast tree $\hat{M}$ may initiate the replication process of subfiles $F_1, \ldots, F_k$ to the next, secondary multicast tree $m_i = \{G_1^i, \ldots, G_m^i\}$ (see FIG. 4). Preferably, these transfers are asynchronous within the group $\hat{G}_i = \{N_1^i, \ldots, N_k^i\}$. When node $N_j^i$ receives the entire subfile $F_j$ in the primary multicast tree $\hat{M}$, it immediately starts transferring subfile $F_j$ to group $G_1^i$ of the secondary tree $M^i$ using the group communication step. For example, as shown in FIG. 4, once each node of group $\hat{G}_1$ of primary tree $\hat{M}$ receives its respective subfile from origin node $N_0$, such node of group $\hat{G}_1$ may terminate its communication connection with origin node $N_0$ and replace such communication connection with a connection to a corresponding node of group $G_1^1$ of secondary multicast tree $M^1$ for communicating its respective subfile that it received from origin node $N_0$ to the node of group $G_1^1$.

Figure 7:
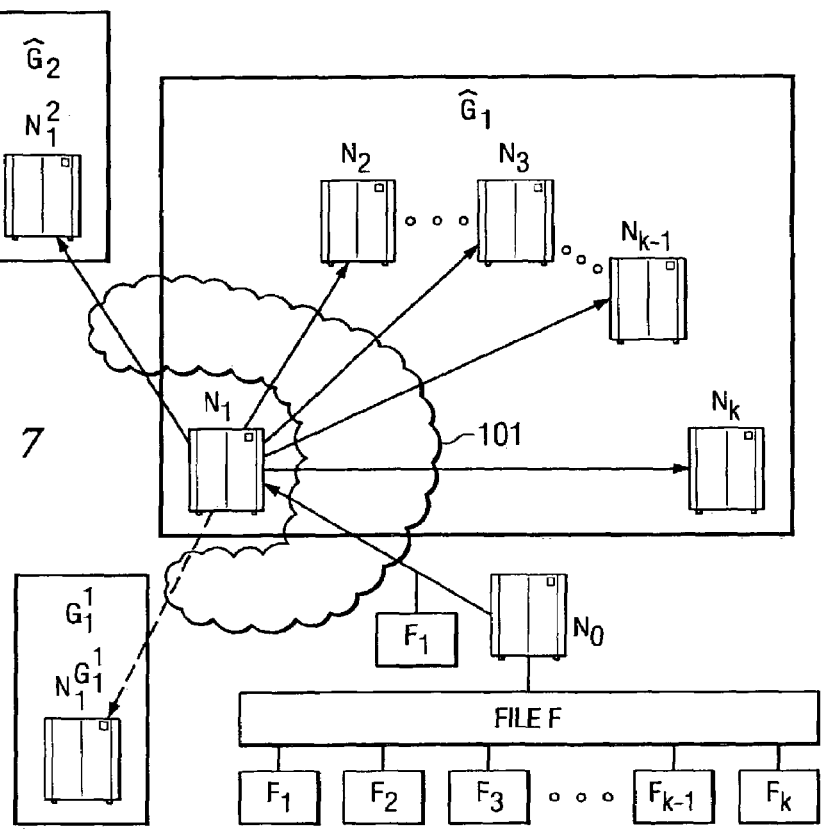
FIG. 7 shows the set of communication paths that may be concurrently utilized during the file distribution from an origin node $N_0$ to a first recipient node $N_1$ under a file distribution algorithm of one embodiment of the present invention.

FIG. 7 shows the set of communication paths that may be concurrently utilized during the file distribution from node $N_0$ to node $N_1$ under the ALM-FastReplica algorithm (with node $N_1$ shown as a representative of the recipient nodes). As explained above, during the distribution process, origin node $N_0$ communicates subfiles $F_1, F_2, F_3, \ldots, F_{k-1}, F_k$ to recipient nodes $N_1, N_2, N_3, \ldots, N_{k-1}, N_k$, respectively, via concurrent communication paths. As shown in FIG. 7, origin node $N_0$ has a communication connection to recipient node $N_1$ for communicating subfile $F_1$ thereto. And, in accordance with the collection process, node $N_1$ communicates subfile $F_1$ to the other recipient nodes $N_2, N_3, \ldots, N_{k-1}, N_k$ of replication group $\hat{G}_1$, respectively, via concurrent communication paths. Thus, node $N_1$ may begin communicating a portion of subfile $F_1$ to the other recipient nodes $N_2, N_3, \ldots, N_{k-1}, N_k$ of replication group $\hat{G}_1$ before node $N_1$ receives all of subfile $F_1$ from origin node $N_0$. For instance, node $N_1$ may communicate packets of subfile $F_1$ to the other recipient nodes $N_2, N_3, \ldots, N_{k-1}, N_k$ of replication group $\hat{G}_1$ as such packets of subfile $F_1$ are received by node $N_1$ from origin node $N_0$, rather than waiting for the receipt of all packets of subfile $F_1$ for commencing the communication to the other recipient nodes $N_2, N_3, \ldots, N_{k-1}, N_k$.

Of course, also in the collection step, node $N_1$ may simultaneously have k−1 concurrent communication paths established with recipient nodes $N_2, N_3, \ldots, N_{k-1}, N_k$ for receiving subfiles $F_2, F_3, \ldots, F_{k-1}, F_k$ from those recipient nodes (not shown in FIG. 7 for simplicity). For instance, each of the other recipient nodes $N_2, N_3, \ldots, N_{k-1}, N_k$ of replication group $\hat{G}_1$ may begin communicating a portion of their respective subfiles that they are receiving from origin node $N_0$ to node $N_1$ before the other recipient nodes receive all of their respective subfile from origin node $N_0$. For instance, node $N_2$ may communicate packets of subfile $F_2$ to the other recipient nodes $N_1, N_3, \ldots, N_{k-1}, N_k$ of replication group $\hat{G}_1$ as such packets of subfile $F_2$ are received by node $N_2$ from origin node $N_0$, rather than waiting for the receipt of all packets of subfile $F_2$ for commencing the communication to the other recipient nodes $N_1, N_3, \ldots, N_{k-1}, N_k$.

Accordingly, each of the recipient nodes $N_1, N_2, N_3, \ldots, N_{k-1}, N_k$ of replication group $\hat{G}_1$ may concurrently have a communication path established with origin node $N_0$ for receiving a corresponding one of subfiles $F_1, F_2, F_3, \ldots, F_{k-1}, F_k$ therefrom; each of the recipient nodes $N_1, N_2, N_3, \ldots, N_{k-1}, N_k$ of replication group $\hat{G}_1$ may have k−1 concurrent communication paths established with the other remaining recipient nodes for communicating its respective subfile that it receives from origin node $N_0$ to the remaining recipient nodes; and each of the recipient nodes $N_1, N_2, N_3, \ldots, N_{k-1}, N_k$ of replication group $\hat{G}_1$ may simultaneously have k−1 concurrent communication paths established with the other remaining recipient nodes for receiving subfiles from those remaining recipient nodes.

In certain embodiments, k corresponds to the maximum concurrent connections supportable by each recipient node $N_1, \ldots, N_k$. Further, if the total number n of recipient nodes to which file F is to be distributed is greater than k, then the nodes may be logically organized into a plurality of replication groups each having k nodes. In such case, after recipient node $N_1$ of group $\hat{G}_1$ receives its entire subfile $F_1$ from origin node $N_0$, the communication connection with node $N_0$ may be terminated and a connection with a recipient node of a different replication group may be established, such as with node $N_1^{G_1^1}$ of replication group $G_1^1$ shown in the example of FIG. 7. For instance, after each node $N_i$ of group $\hat{G}_1$ receives its entire subfile $F_i$ from origin node $N_0$, its communication connection with node $N_0$ may be terminated and a replaced with a connection with a corresponding recipient node of a different replication group, such as with node $N_i^{G_1}$ of replication group $G_1^1$ shown in the example of FIG. 7. The recipient nodes of such different replication group may follow a fast-forward mode of distributing among themselves their respective subfiles that they are receiving from the nodes of replication group $\hat{G}_1$.

In certain embodiments, k+1 corresponds to the maximum concurrent connections supportable by each recipient node $N_1, \ldots, N_k$. Further, if the total number n of recipient nodes to which file F is to be distributed is greater than k, then the nodes may be logically organized into a plurality of replication groups each having k nodes. As described above with FIG. 4, the plurality of replication groups may be logically organized into a primary multicast tree, and in certain embodiments the logical organization may further include secondary multicast tree(s). As an example of this embodiment, each recipient node of replication group $\hat{G}_1$ may establish a concurrent communication connection with a corresponding recipient node of a different replication group, such as with replication group $\hat{G}_2$ of FIG. 7 (see also FIG. 4) and begin communicating the subfile that it receives from origin node $N_0$ before such subfile is fully received from origin node $N_0$.

An example of this embodiment is shown for node $N_1$ in FIG. 5. As described above, recipient node $N_1$ of replication group $\hat{G}_1$ may concurrently have: 1) a communication path established with origin node $N_0$ for receiving subfile $F_1$ therefrom, 2) k−1 concurrent communication paths established with the other remaining recipient nodes $N_2, N_3, \ldots, N_{k-1}, N_k$ of group $\hat{G}_1$ for communicating its respective subfile $F_1$ that it receives from origin node $N_0$ to the remaining recipient nodes, and 3) k−1 concurrent communication paths established with the other remaining recipient nodes $N_2, N_3, \ldots, N_{k-1}, N_k$ for receiving the respective subfiles $F_1, \ldots, F_k$ from those remaining recipient nodes. Additionally, node $N_1$ may concurrently have a communication connection to a node of another replication group, such as node $N_1^2$ of group $\hat{G}_2$ in FIG. 7. Thus, node $N_1$ may begin communicating subfile $F_1$ to node $N_1^2$ of group $\hat{G}_2$ before node $N_1$ receives the full subfile $F_1$ from origin node $N_0$. As described above, group $\hat{G}_2$ may be referred to herein as being a group within a primary multicast tree, such as primary multicast tree $\hat{M}$ of FIG. 4. After node $N_1$ fully receives subfile $F_1$ from origin node N0, it may terminate its communication connection with origin node N0 and replace it with a communication connection to a node of another replication group, such as node $N_i^{G_1}$ of replication group $G_1^1$ shown in the example of FIG. 7. As described above, group $G_1^1$ may be referred to herein as being a group within a secondary multicast tree, such as within secondary multicast tree $M^1$ of FIG. 4.

In certain embodiments, k+2 corresponds to the maximum concurrent connections supportable by each recipient node $N_1, \ldots, N_k$. Further, if the total number n of recipient nodes to which file F is to be distributed is greater than k, then the nodes may be logically organized into a plurality of replication groups each having k nodes. In such case, each node of replication group $\hat{G}_1$ may establish a concurrent communication connection with each of the other recipient nodes of such replication group $\hat{G}_1$, as well as with a recipient node of each of two different replication groups of the primary multicast tree. For instance, in the example shown in FIG. 7 for node $N_1$, such recipient node $N_1$ of replication group $\hat{G}_1$ may concurrently have: 1) a communication path established with origin node $N_0$ for receiving subfile $F_1$ therefrom, 2) k-1 concurrent communication paths established with the other remaining recipient nodes $N_2, N_3, \ldots, N_{k-1}, N_k$ of group $\hat{G}_1$ for communicating its respective subfile $F_1$ that it receives from origin node $N_0$ to the remaining recipient nodes, and 3) k-1 concurrent communication paths established with the other remaining recipient nodes $N_2, N_3, \ldots, N_{k-1}, N_k$ for receiving the respective subfiles $F_1, \ldots, F_k$ from those remaining recipient nodes. Additionally, node $N_1$ may concurrently have a communication connection to a node of another replication group, such as node $N_1^2$ of group $\hat{G}_2$ in FIG. 7. Further, in this example embodiment, node $N_1$ may concurrently have a communication connection to a node of another replication group of the primary multicast tree (such other node not shown in FIG. 7). Thus, node $N_1$ may begin communicating subfile $F_1$ to node $N_1^2$ of group $\hat{G}_2$, as well as to the corresponding node of another replication group in the primary multicast tree, before node $N_1$ receives the full subfile $F_1$ from origin node $N_0$.

Turning now to FIG. 8, an example-operational flow diagram for distributing a file from an origin node to a plurality of recipient-nodes in accordance with one embodiment of the present invention is shown. In operational block 801, a number of subfiles, into which file F is to be partitioned is determined. For instance, as shown in the example of FIGS. 1-3 above, in certain embodiments a ALM-FastReplica technique may be implemented in which file F may be partitioned into a number of subfiles corresponding to the number k of concurrent communication connections supportable by each recipient node. In operational block 802, file F is partitioned into the determined number of subfiles.

In operational block 803, a subfile is distributed from an origin node to each of a plurality of recipient nodes, wherein all of the subfiles comprising file F are distributed from the origin node. However, all of the subfiles are not distributed from the origin node to each of the plurality of recipient nodes. As shown, in certain embodiments block 803 may comprise operational block 803A, wherein a different subfile is distributed to each recipient node within the distribution group, as in the example of FIGS. 1-3 above in which the ALM-FastReplica technique is implemented. That is, each recipient node may receive a unique subfile from the origin node that is not received by any of the other recipient nodes within the distribution group.

In operational block 804, the plurality of recipient nodes exchange their respective subfiles such that each recipient node obtains all of the determined number of subfiles comprising file F. More specifically, as described above, each of the plurality of recipient nodes begins to communicate the subfile that it receives from the origin node to the other recipient nodes before fully receiving such subfile from the origin node.

In operational block 805, scaling operations may be performed, if needed. That is, if the number of recipient nodes is sufficiently large, the distribution process may be scaled to enable distribution to such a large number of recipient nodes. For instance, the distribution technique may be scaled to allow for a file distribution to hundreds, thousands, or tens of thousands, of recipient nodes, for example. More particularly, if it is determined that the number k of concurrent communication connections that can be supported by each of the nodes $N_0, \ldots, N_n$ is less than the total number n of recipient nodes n, then the distribution technique may be scaled for distribution to a plurality of groups of recipient nodes as described further below. Various suitable scaling techniques may be utilized. One scaling technique that may be utilized in certain embodiments comprises logically arranging the recipient nodes into a plurality of replication groups, and such replication groups may be logically organized into primary, and in some instances secondary, multicast trees, as described above with FIG. 4.

The ALM-FastReplica distribution technique is further described in concurrently filed and commonly assigned U.S. patent application Ser. No. 10/619,737 titled "SYSTEM AND METHOD HAVING IMPROVED EFFICIENCY FOR DISTRIBUTING A FILE AMONG A PLURALITY OF RECIPIENTS", the disclosure of which is hereby incorporated herein by reference.

Embodiments of the present invention improve the robustness (or "reliability") of the above-described file distribution process (e.g., the ALM-FastReplica algorithm) to deal with node failures. As can be seen from the above description of ALM-FastReplica, for example, such ALM-FastReplica algorithm is sensitive to node failures. For example, if node $N_i$ fails during the collection step shown in FIGS. 2 and 3, this event may impact all other nodes $N_2, \ldots, N_k$ in this distribution group because each node depends on node $N_1$ to receive subfile $F_1$. A similar situation occurs in the example scaled ALM-FastReplica algorithm described above (e.g., as shown in FIG. 4-6), where a failure of node $N_i$ during a file replication may impact all the nodes in the dependent groups of a primary and/or secondary multicast tree because the nodes in such groups should receive subfile $F_i$ from node $N_i$. For example, if node if node $N_1^1$ (from group $\hat{G}_1$ in primary multicast tree $\hat{M}$ of FIG. 4) fails during either the distribution or collection steps, then this event may impact all nodes $N_2^1, \ldots, N_k^1$ in the group $\hat{G}_1$ because each node depends on node $N_1^1$ to replicate subfile $F_1$. A similar situation occurs if a failure of node $N_i^1$ occurs during the group communication step between groups $\hat{G}_1$ and $\hat{G}_2$ of primary multicast tree $\hat{M}$ this failure may impact all the nodes in the dependent subtree, i.e., all groups in the primary multicast tree $\hat{M}$ following group $\hat{G}_1$ (such as groups $\hat{G}_2$-$\hat{G}_m$ shown in FIG. 4), because the nodes in this subtree should receive subfile $F_i$ from node $N_i^1$.

An embodiment of the present invention provides a reliable distribution technique (such as the above-described ALM-FastReplica distribution technique) that efficiently deals with node failures by making a local "repair decision" (which may be referred to herein as a local "distribution detour decision") within the particular group of nodes. As described below, an embodiment of the present invention, keeps the main structure of the ALM-FastReplica algorithm described above practically unchanged, while adding the desired property of resilience to node failures.

As an example of one embodiment, consider the nodes comprising group $\hat{G}_1$ in the example discussed above in conjunction with FIG. 4. Such group $\hat{G}_1$ is referred to herein as an initial group. In this example embodiment, special attention is paid to group $\hat{G}_1$ and node failures in it. Nodes of group $\hat{G}_1$ are referred to herein as initial nodes. The rest of the groups are referred to as subsequent groups, and their nodes are referred to as subsequent nodes.

There are several communication patterns in which a node $N_i^j$ might be involved in the ALM-FastReplica distribution technique at a moment of its failure. If node $N_i^j$ is an initial node (i.e., is a node of group $\hat{G}_1$ in this example, such that $N_i^j = N_i^1$), it may fail during any of the following:

1. Node $N_i^1$ of group $\hat{G}_1$ may fail during the distribution step while (or before) node $N_0$ is communicating subfile $F_i$ to node $N_i^1$. Only node $N_0$ has subfile $F_i$ at this point (none of the nodes in group $\hat{G}_1$ has received this subfile $F_i$ yet). Since node $N_i^1$ is failed during (or before) the communication of subfile $F_i$ from $N_0$ to node $N_i^1$, node $N_0$ is aware of node $N_i^1$'s failure. For instance, node $N_0$ may receive an error message (e.g., it will get no "ACK" for sent packets and eventually a TCP timeout may be encountered) when attempting to communicate the subfile $F_i$ to node $N_i^1$ indicating to node $N_0$ that the communication of subfile $F_i$ to node $N_i^1$ was unsuccessful.
2. Node $N_i^1$ may fail during the collection step, when node $N_i^1$ has received a portion (e.g., the first bytes) of subfile $F_i$ and started to communicate it to the remaining nodes in group $\hat{G}_1$.
3. Node $N_i^1$ may fail during the group communication step in the primary multicast tree $\hat{M}$. That is, node $N_i^1$ may fail when it is communicating subfile $F_i$ to node $N_i^2$ of group $\hat{G}_2$.
4. Node $N_i^1$ may fail during the group communication step in the secondary multicast tree $M^1$. That is, node $N_i^1$ may fail when it is communicating subfile $F_i$ to node $N_i^{G_1^1}$ of group $G_1^1$. The crucial difference of node $N_i^1$'s failure at this step is that any node in group $\hat{G}_1$ already has the entire file F, and in particular, the subfile $F_i$, at this point.

According to one embodiment of the present invention, the nodes within each distribution group $G_j = \{N_1^j, \ldots, N_k^j\}$ exchange heartbeat messages. Further, according to this embodiment of the present invention, node $N_i^j$ of group $G_j$ sends heartbeat messages to node $N_i^{j-1}$ of group $G_{j-1}$. That is, each node of a distribution group may send heartbeat messages to a corresponding node of an earlier distribution group in the distribution tree (e.g., in the primary and/or secondary multicast tree). For instance, node $N_i^j$ of a distribution group $G_j$ may send heartbeat messages to a corresponding node $N_i^{j-1}$ of an earlier distribution group $G_{j-1}$ from which node $N_i^j$ is to receive subfile $F_i$ in accordance with the ALM-FastReplica distribution technique described above. Such heartbeat messages nay be augmented with additional information on the corresponding algorithm step(s) and the current replication list of nodes corresponding to the identified algorithm step(s).

It should be recognized that because the ALM-FastReplica technique may perform distribution, collection, and group communication steps concurrently, as described above, a node may be involved with a plurality of such steps at the time of any given heartbeat. Table 1 shows an example heartbeat message that may be communicated by node $N_1^1$. As shown in the example of Table 1, node $N_1^1$ is involved with both collection and group communication steps at the time of this example heartbeat message. Thus, in this example, the origin node $N_0$ has completed its distribution of subfile $F_i$ to node $N_1^1$ and such node $N_1^1$ is completing its collection and group communication steps of the above-described ALM-FastReplica technique. The distribution list identifies nodes $\{N_2^1, \ldots, N_k^1\}$ with which node $N_1^1$ is performing the collection step, and node $\{N_1^2\}$ with which node $N_1^1$ is performing the group communication step in this example.

TABLE 1

| Node Identification | Node Status | Current Replication Step(s) | Current Distribution List |
|---|---|---|---|
| $N_1^1$ | I'm Alive | Collection; and Group Communication | Nodes $\{N_2^1, \ldots, N_k^1\}$, and $\{N_1^2\}$ |

The information about the corresponding algorithm step currently being performed by a particular node in a group is included in the heartbeat message because of the asynchronous nature of the above-described ALM-FastReplica algorithm. For example, while some of the nodes of group $\hat{G}_1$ may be performing file distribution in the primary multicast tree $\hat{M}$ (i.e., they are still replicating their respective subfiles received from origin node $N_0$ to the other nodes of group $\hat{G}_1$ and/or to corresponding nodes of group $\hat{G}_2$ of the primary multicast tree), some other "faster" nodes of the same group $\hat{G}_1$ might already have started performing file distribution in a secondary multicast tree $M^1$ (i.e., they are replicating their respective subfiles to the corresponding nodes of group $G_1^1$ of the secondary multicast tree $M^1$ as shown in the example of FIG. 4).

Thus in case of node failure, it is desirable to know:
(a) which particular node in the group has failed;
(b) whether the node is an initial node;
(c) whether the corresponding step(s) of the algorithm for which the failed node is currently responsible for performing is/are distribution, collection, and/or group communication step(s); and
(d) which multicast tree, group, and set of receiving nodes is impacted as a result of this failure.

According to an embodiment of the present invention, a different "repair procedure" may be utilized depending on the circumstances under which the node failure occurred (e.g., whether the failed node is an initial node currently responsible for performing the distribution, collection, and/or group communication steps in a primary multicast tree of the ALM-FastReplica algorithm, or whether the failed node fails during the group communication step wherein the failed node is either a subsequent node or an initial node performing the group communication step to a secondary multicast tree of the ALM-FastReplica algorithm). First, consider when an initial node $N_i^1$ of group $\hat{G}_1$ fails during distribution, collection, and/or group communication step(s) in a primary multicast tree $\hat{M}$ of the above-described ALM-FastReplica algorithm. In this case, origin node $N_0$ is either aware of node $N_i^1$'s failure (because it received an error message when attempting to communicate the subfile $F_i$ to node $N_i^1$ indicating to node $N_0$ that the communication of subfile $F_i$ to node $N_i^1$ was unsuccessful) or receives a message about this failure from the heartbeat group $\hat{G}_1$. An example of a node failure under these circumstances is described further below in conjunction with FIGS. 9-10C.

Figure 9:
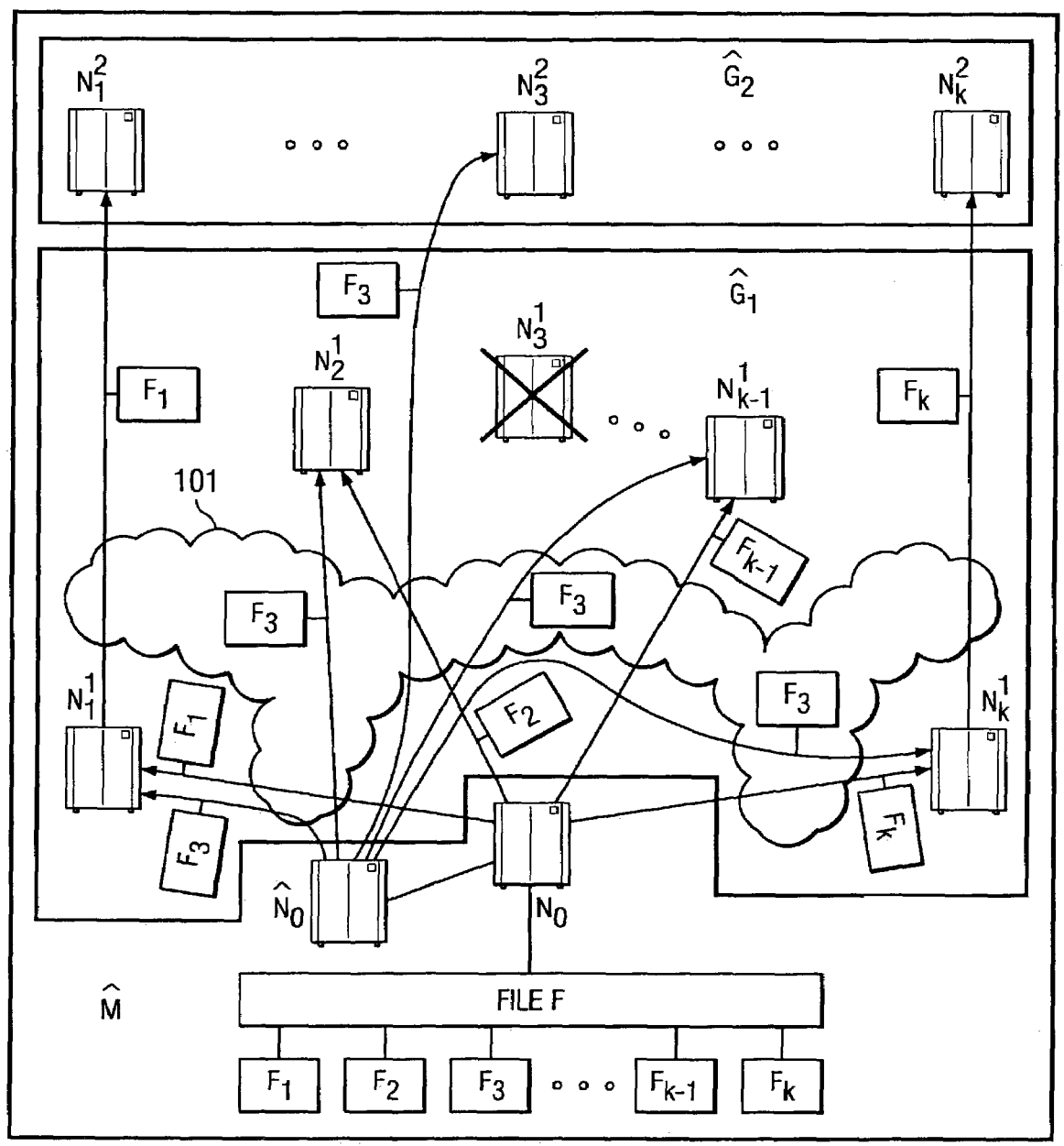
FIG. 9 shows an example repair procedure for a failed node in group $\hat{G}_1$ of primary multicast tree $\hat{M}$ of FIG. 4.

An example of such a node failure during the distribution step and an example technique for "repairing" the distribution of file F to the nodes of the distribution group is shown in FIG. 9. More specifically, FIG. 9 shows an example in which origin node $N_0$ is distributing subfiles $\{F_1, \ldots, F_k\}$ to recipient nodes $\{N_1^1, \ldots, N_k^1\}$ of group $\hat{G}_1$ of primary multicast tree $\hat{M}$. In the example of FIG. 9, node $N_3^1$ has failed. Accordingly, origin node $N_0$ is unable to communicate subfile $F_3$ to node $N_3^1$. At the time of failure of node $N_3^1$, it may be involved with the distribution step (receiving subfile $F_3$ from origin node $N_0$), and it may also concurrently be involved with performance of the collection step, (communicating received portions of subfile $F_3$ to the other nodes of group $\hat{G}_1$) and/or performance of a group communication (communicating received portions of subfile $F_3$ to a corresponding node $N_3^2$ of group $\hat{G}_2$) as described above for the ALM-FastReplica distribution algorithm.

In this example, origin node $N_0$ is either aware of node $N_3^1$'s failure (because origin node $N_0$ received an error message when attempting to communicate the subfile $F_3$ to node $N_3^1$ indicating to node $N_0$ that the communication of subfile $F_3$ to node $N_3^1$ was unsuccessful) or origin node $N_0$ receives a message about this failure from the heartbeat group $\hat{G}_1$. Because origin node $N_0$ is the root of the overall replication procedure in this example, to avoid a single point of failure it may be implemented having a "buddy-node" $\hat{N}_0$ with mirrored information and data in certain embodiments, as shown in FIG. 9. In such an implementation, node $N_0$ may send a message to mirrored node $\hat{N}_0$ to open k−1 network connections to the rest of the nodes in group $\hat{G}_1$ for sending the missing subfile $F_3$ to each node in that group. Thus, as shown in the example of FIG. 9, mirrored (or "buddy") node $\hat{N}_0$ may perform the following "repair" step (or "distribution detour"): it establishes k−1 communication connections to the rest of the nodes in group $\hat{G}_1$ (i.e., the non-failed nodes $\{N_1^1, N_2^1, \text{and}, N_4^1, \ldots, N_k^1\}$) to send the missing $F_3$ subfile to each such non-failed node in group $\hat{G}_1$. Further, as also shown in FIG. 9, mirrored node $\hat{N}_0$ may establish a communication connection with node $N_3^2$ of group $\hat{G}_2$ to which failed node $N_3^1$ is responsible for distributing subfile $F_3$ through the group communication step of the above-described ALM-FastReplica algorithm, and mirrored node $\hat{N}_0$ may use such communication connection to communicate subfile $F_3$ to node $N_3^2$. It should be recognized that buddy node $\hat{N}_0$ may distribute subfile $F_3$ to each non-failed node in group $\hat{G}_1$ and to node $N_3^2$ of group $\hat{G}_2$ concurrently with origin node $N_0$ performing distribution to the non-failed nodes of group $\hat{G}_1$.

The process of enabling reliable distribution to non-failed nodes even when a failed node exists in a distribution group may be referred to as a "repair" of the distribution. Although the failed node itself is not repaired by this process (but may instead remain in a failed state). Thus, the use of "repair" herein should not be confused with repairing an actual failed node, but is instead used as repairing a distribution process that is dependent on a failed node. This process may instead be referred to herein as a "detoured" distribution process. For instance, in the above example the subfile $F_3$ is distributed to the non-failed nodes via a detour around the failed node $N_3^1$.

Thus, after the above-described detouring of the distribution and group communication steps of FIG. 9, each of the non-failed nodes in group $\hat{G}_1$ has all of the subfiles of original file F. Further, node $N_3^2$ of group $\hat{G}_2$ receives subfile $F_3$.

Figure 10A:
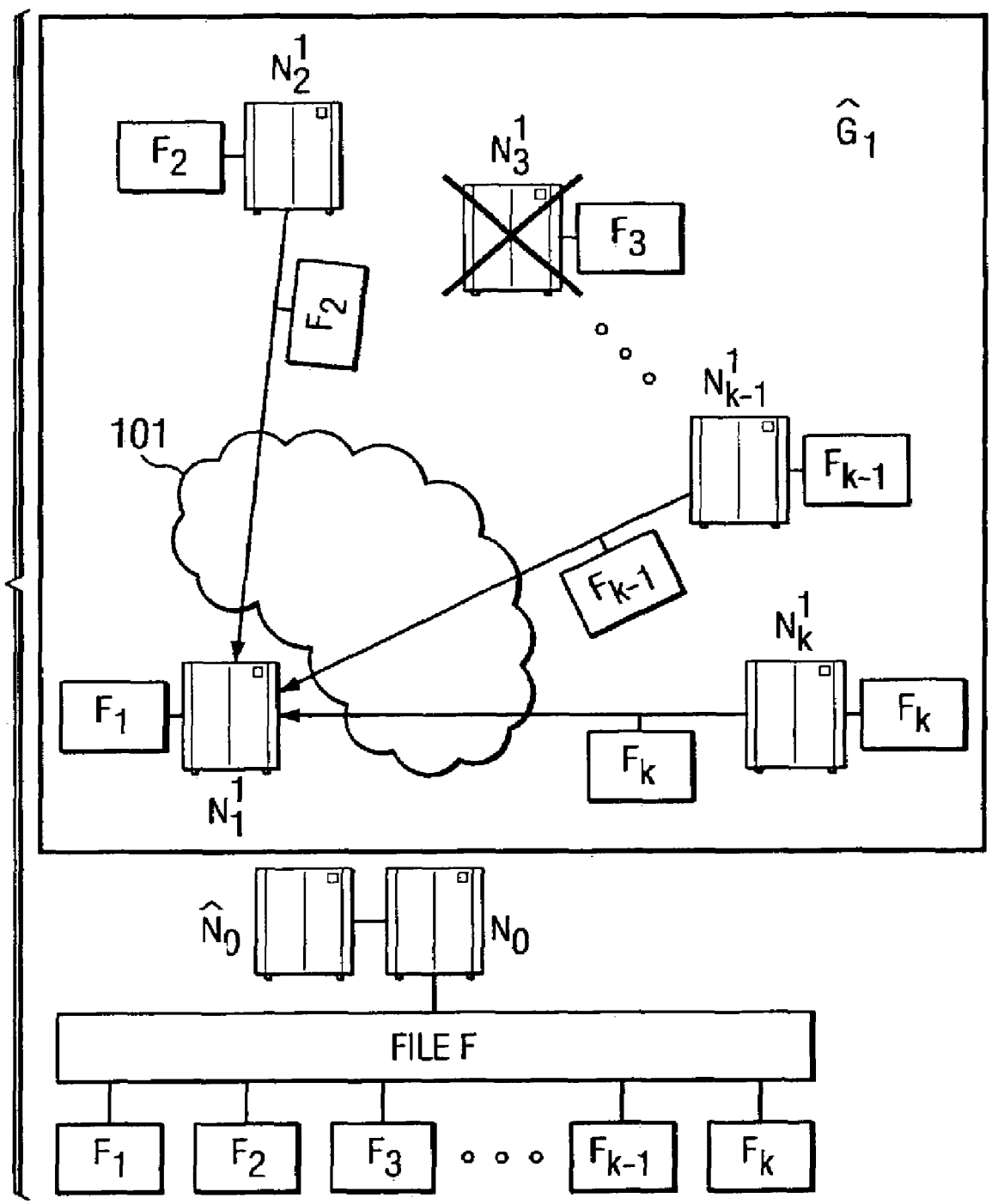
FIGS. 10A-10C show an example repair procedure for a failed initial node (of group $\hat{G}_1$) of FIG. 4 after such node has fully received its respective subfile from the origin node but before it has forwarded all of such subfile on to the other nodes of the group.
Figure 10B:
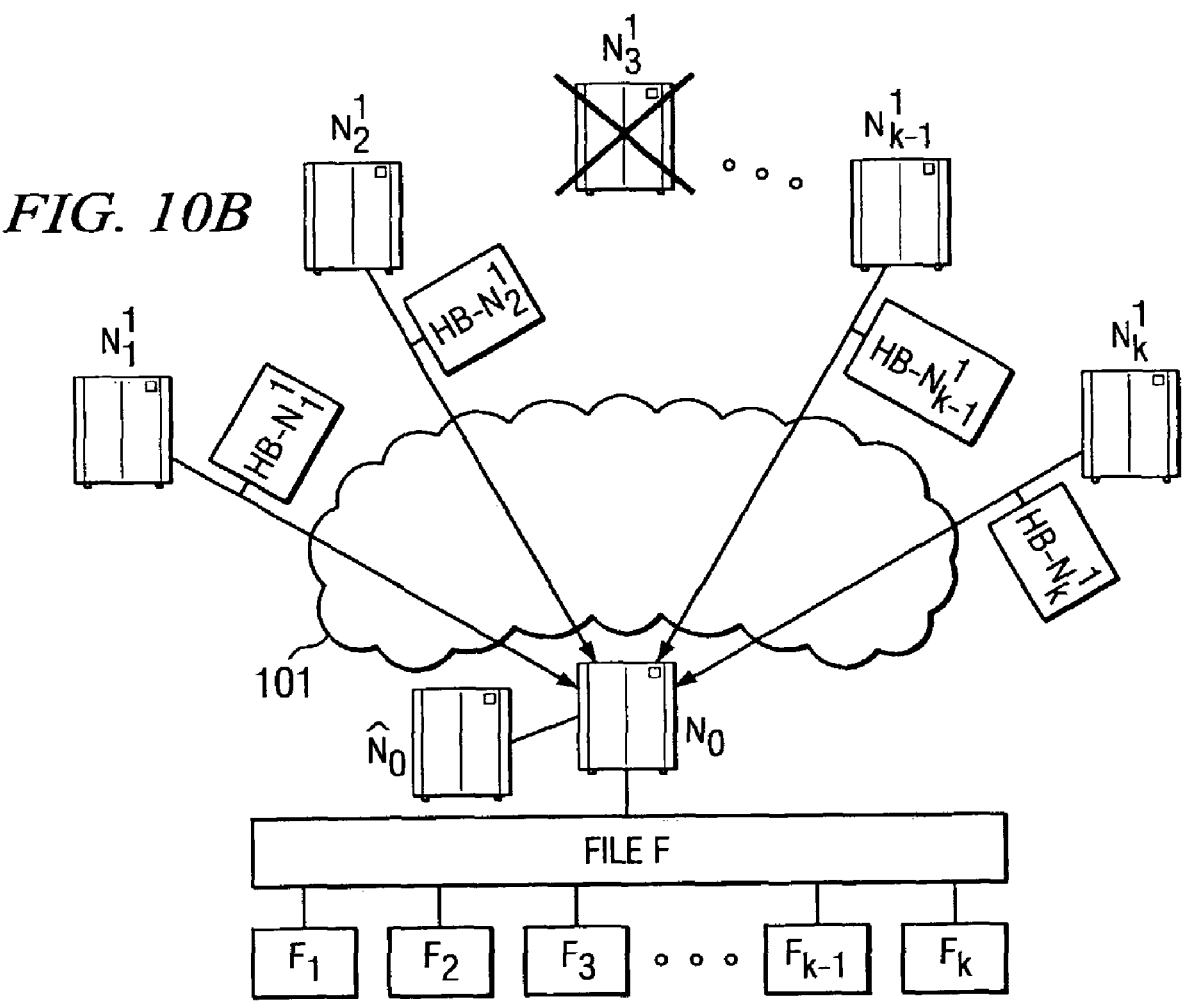
Figure 10C:
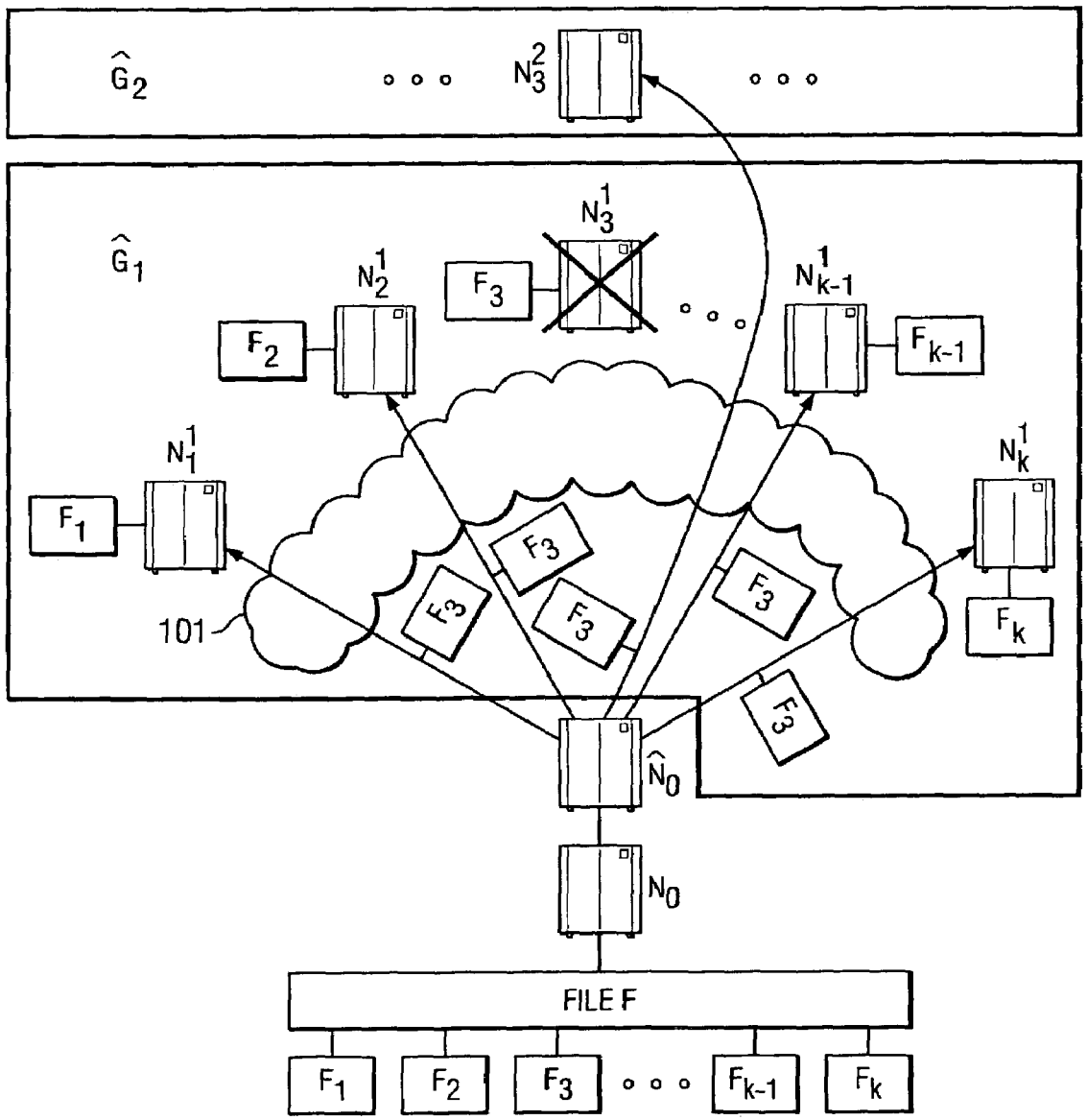

Consider instead now that a node failure occurs for an initial node (of group $\hat{G}_1$) after such node has fully received its respective subfile from the origin node but before it has forwarded all of such subfile on to the other nodes of the group. An example of such a node failure under these circumstances and an example technique for "repairing" the replication of file P to the nodes of the replication group is shown in FIGS. 10A-10C. More specifically, FIG. 10A shows an example in which the nodes of group $\hat{G}_1$ have each fully received their respective subfiles from origin node $N_0$ and are completing the collection step of the ALM-FastReplica algorithm by communicating the final portions of their respective subfiles to each of the other nodes of the group. For instance, as shown in the example of FIG. 10A, all of the non-failed nodes are communicating the final portions of their respective subfiles to node $N_1^1$. Of course, while not shown in FIG. 10A for conciseness, each of the non-failed nodes may have concurrent communication connections with each of the other non-failed nodes to concurrently exchange their respective subfiles.

In the example of FIG. 10A, node $N_3^1$ has failed. In this case, node $N_3^1$ failed after the subfile $F_3$ was fully distributed to such node $N_3^1$ from origin node $N_0$. Thus, node $N_3^1$ has the entire subfile $F_3$ stored thereto and has terminated its communication connection with origin node $N_0$, but is unable to communicate such subfile $F_3$ to the other recipient nodes of group $\hat{G}_1$. In this case, node $N_0$ is unaware of node $N_3^1$'s failure because the communication of subfile $F_3$ to node $N_3^1$ has completed before node $N_3^1$ fails.

According to one embodiment of the present invention, heartbeat messages are used between the nodes of a distribution group (e.g., group $\hat{G}_1$ in the above example) to detect when one of the nodes fails. For instance, using the heartbeat messages of one embodiment, the failure of node $N_3^1$ is detected by nodes within group $\hat{G}_1$, and this information is sent to origin node $N_0$. For example, each node of group $\hat{G}_1$ may periodically send a heartbeat message to origin node $N_0$, such as the example heartbeat message of Table 1, as shown in FIG. 10B. For instance, in the example of FIG. 10B, nodes $\{N_1^1, N_2^1, \text{and } N_4^1, \ldots, N_k^1\}$ send heartbeat messages $\{HB-N_1^1, HB-N_2^i, \text{and } HB-N_4^1, \ldots, HB-N_k^1\}$, respectively, to node $N_0$. Upon node $N_0$ recognizing that a heartbeat message is not received from node $N_3^1$, node $N_0$ detects that node $N_3^1$ has failed. As another example, in addition to or rather than the recipient nodes of group $\hat{G}_1$ periodically sending heartbeat messages to their origin node $N_0$, such recipient nodes may exchange heartbeat messages with each other. For instance, the recipient nodes of a group (e.g., $\hat{G}_1$) may exchange heartbeat messages with each other, and upon a recipient node detecting that another node of the group has failed (e.g., which may be detected by a heartbeat message from the failed node not being received in a given time frame) the detecting recipient node may notify the origin node of the failed node's failure.

Once origin node $N_0$ detects a failed node (e.g., is notified of a node's failure by another recipient node in the group), in one embodiment of the present invention origin node $N_0$ triggers its buddy node $\hat{N}_0$ to perform the following "repair" step (or "distribution detour"): it opens connections to the impacted nodes in group $\hat{G}_1$ and $\hat{G}_2$ to send missing subfile $F_3$ to such nodes, as shown in FIG. 10C. For instance, buddy node $\hat{N}_0$ opens communication connections with nodes $\{N_1^1, N_2^1, \text{and } N_4^1, \ldots, N_k^1\}$ of group $\hat{G}_1$ to send subfile $F_3$ thereto, and it opens a communication connection to node $N_3^2$ of group $\hat{G}_2$ to send subfile $F_3$ thereto.

Thus, after the above-described detoured distribution step of FIG. 10C, each of the non-failed nodes in group $\hat{G}_1$ has all of the subfiles of original file F. Further, node $N_3^2$ of group $\hat{G}_2$ receives subfile $F_3$.

It should be recognized that the exchange of heartbeat messages by a "group" of nodes may be performed only during the distribution process in certain embodiments. For instance, recipient nodes may be logically "grouped" only for a distribution of a file F, and different distributions (of other files at other times) may comprise different logical groupings of the recipient nodes. Thus, the recipient nodes may exchange heartbeat messages with the other nodes of their group only during a distribution process, and once the distribution is complete, the nodes may no longer be "grouped" or exchange heartbeat messages.

Figure 11A:
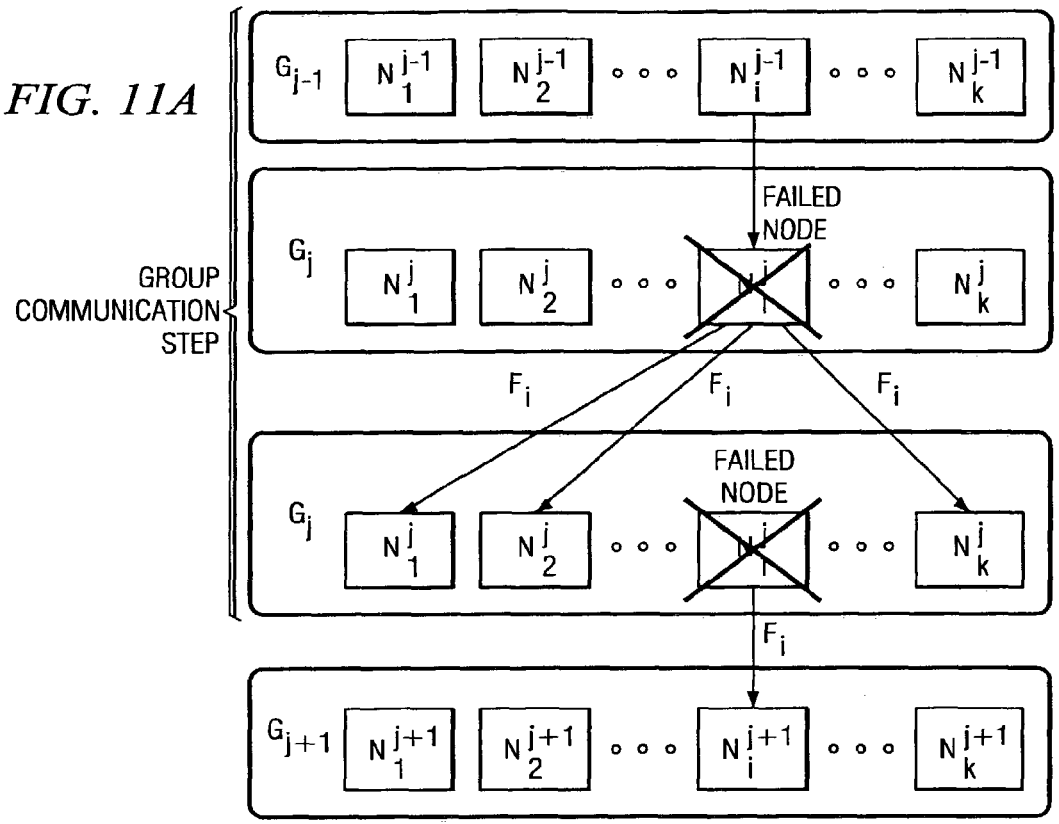
FIGS. 11A-11B show an example repair procedure for a failed subsequent node $N_i^j$ in group $G_j$.
Figure 11B:
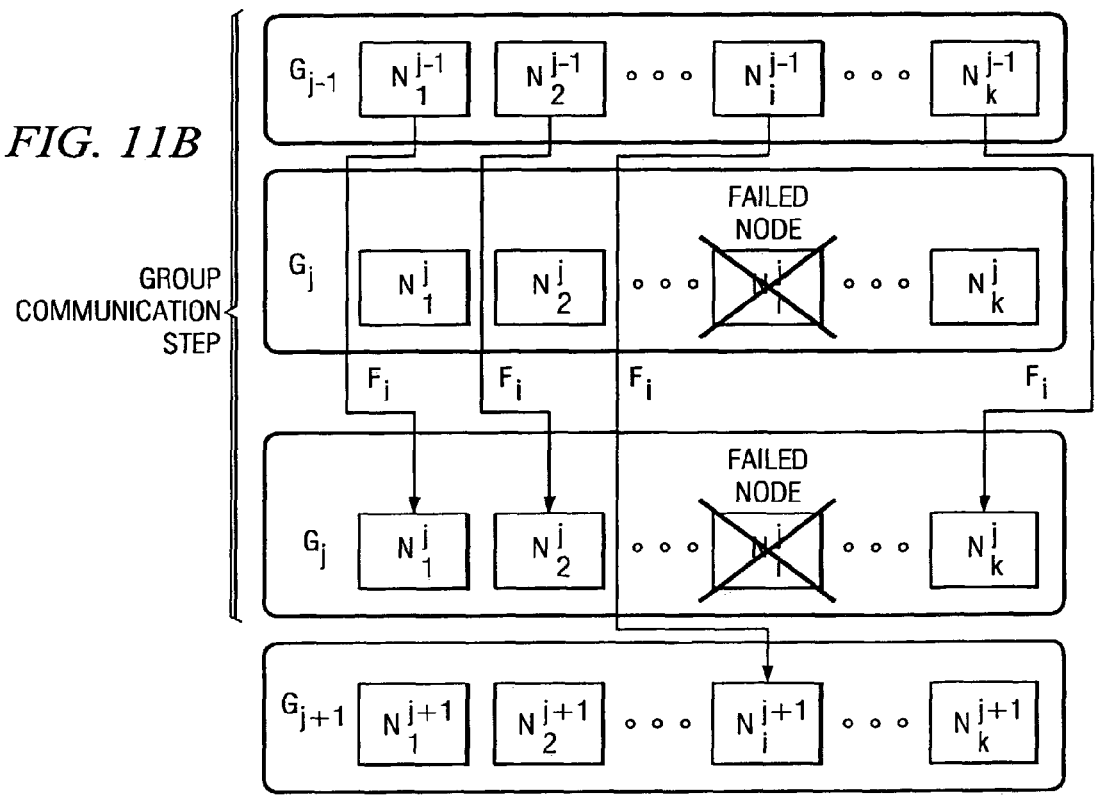

Now consider a node failure occurring during the group communication step wherein the failed node is either: 1) a subsequent node, or 2) an initial node performing the group communication step to a secondary multicast tree of the ALM-FastReplica algorithm. An example of such a node failure under these circumstances and an example technique for "repairing" the replication of file F to the nodes of the replication group is shown in FIGS. 11A-11B. FIG. 11A shows an example of a failed subsequent node $N_i^j$ in group $G_j$ while it was communicating subfile $F_i$ to the rest of the nodes in group $G_j$ (i.e., performing a collection step) and further to node $N_i^{j+1}$ of group $G_{j+1}$ during the group communication step of the example ALM-FastReplica algorithm. Thus, in this example, groups $G_{j-1}$, $G_j$, and $G_{j+1}$ are groups in a primary multicast tree.

An example repair procedure for node $N_i^j$ of the example of FIG. 11A is shown in FIG. 11B. As shown, once node $N_i^{j-1}$ realizes that node $N_i^j$ has failed, node $N_i^{j-1}$ conveys this information to the rest of the nodes in group $G_{j-1}$. The nodes in group $G_{j-1}$ share the additional load of communicating subfile $F_i$ to the nodes of group $G_j$, as shown in FIG. 11B. For instance, each of the nodes of group $G_{j-1}$ communicate subfile $F_i$ to a corresponding node of group $G_j$, as shown in FIG. 11B. Additionally, node $N_i^{j-1}$ communicates subfile $F_i$ to node $N_i^{j+1}$ of group $G_{j+1}$. That is, node $N_i^{j-1}$ effectively substitutes for failed node $N_i^j$ to communicate subfile $F_i$ to the corresponding node $N_i^{j+1}$ of the next group (group $G_{j+1}$ in this example) of the primary multicast tree.

The distribution lists are the same for all the nodes of group $G_j$, and after the "repair" step, the ALM-FastReplica algorithm proceeds in the usual way for the entire subtree originated in group $G_j$. In view of the above, the nodes in group $G_{j-1}$ share the additional load of transferring file $F_i$ to the next, secondary multicast tree of group $G^j$. Since the load of failed node $N_i^j$ is shared among k nodes of group $G_{j-1}$ the performance degradation is gradual for the repaired portion of the distribution tree.

Now consider a node failure occurring during the group communication step wherein the failed node is an initial node performing the group communication step to a secondary multicast tree of the ALM-FastReplica algorithm. This case is similar to that of FIGS. 11A-11B, wherein groups $G_{j-1}$ and $G_j$ are groups in a primary multicast tree and group $G_{j+1}$ is a group in a secondary multicast tree to which group $G_j$ distributes file F. As described above, in the ALM-FastReplica algorithm after fully receiving subfile $F_i$ from node $N_i^{j-1}$, node $N_i^j$ of group $G_j$ may terminate its communication connection with node $N_i^{j-1}$ and begin communicating subfile $F_i$ to node $N_i^{j+1}$ of group $G_{j+1}$ of a secondary multicast tree. Suppose that node $N_i^j$ fails, as shown in FIG. 11A, after it fully receives subfile $F_i$ from node $N_i^{j-1}$ but before it fully communicates such subfile $F_i$ to node $N_i^{j+1}$ of group $G_{j+1}$ of a secondary multicast tree. The example repair procedure for node $N_i^j$ shown in FIG. 11B may be utilized in certain embodiments. More specifically, heartbeat messages may be exchanged between the nodes of group $G_j$, as described above, and upon a node detecting the failure of node $N_i^j$, it may notify node $N_i^{j-1}$ and node $N_i^{j-1}$ may effectively substitute for failed node $N_i^j$ to communicate subfile $F_i$ to the corresponding node $N_i^{j+1}$ of group $G_{j+1}$ of the secondary multicast tree. In certain embodiments, heartbeat messages are exchanged between the nodes of "vertical" (or consequent) groups within a multicast tree, such as between groups $G_j$ and group $G_{j-1}$, and upon node $N_i^{j-1}$ detecting the failure of node $N_i^j$ it may effectively substitute for the failed node to communicate subfile $F_i$ to the corresponding node $N_i^{j+1}$ of group $G_{j+1}$ of the secondary multicast tree, as described above.

Figure 12A:
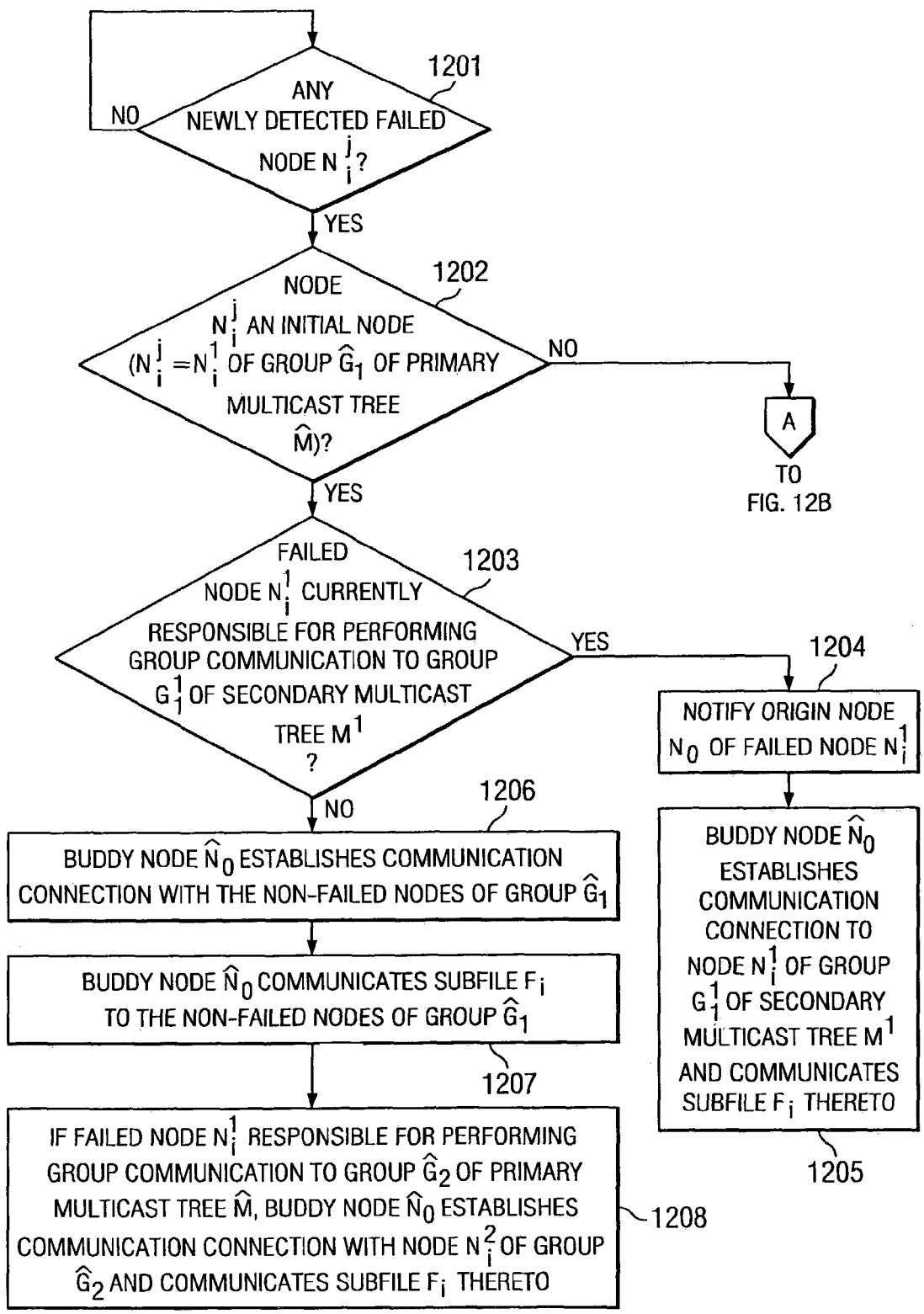
FIGS. 12A-12B show an example operational flow diagram for a repair procedure for the example ALM-FastReplica distribution process of FIG. 4 in accordance with an embodiment of the present invention.
Figure 12B:
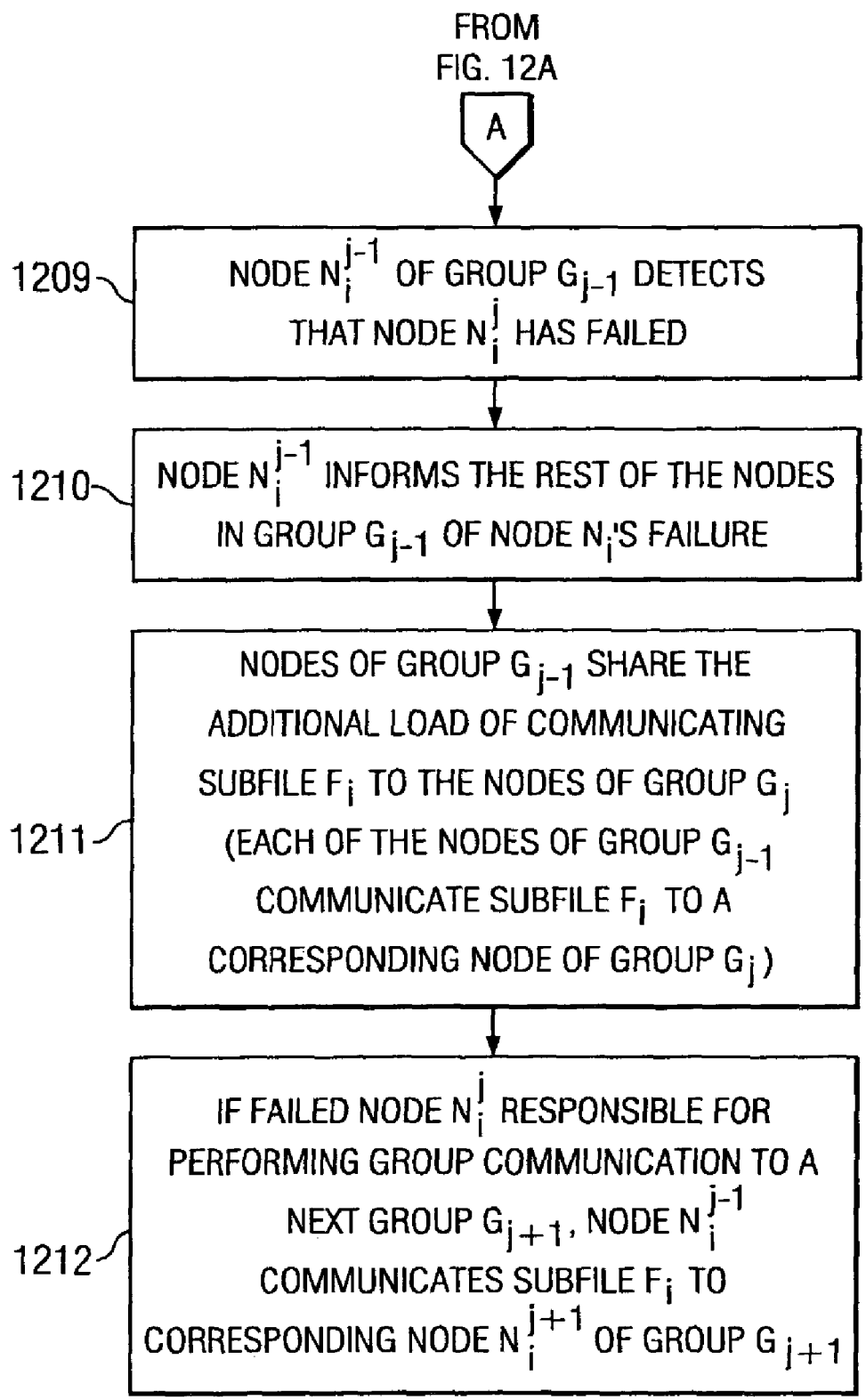

Turning to FIGS. 12A-12B, an example operational flow diagram is shown for a repair procedure for the above-described ALM-FastReplica distribution process in accordance with an embodiment of the present invention. As shown in FIG. 12A, operation of this example embodiment starts with operational block 1201, whereat it is determined whether any nodes involved in the distribution process have failed. As described above, during the distribution process a recipient node may be detected as having failed in a number of different ways including, as examples, through the exchange of heartbeat messages and/or through a failed communication with a node (e.g., origin node) attempting to distribute a subfile to the failed node. If a node is not detected as failed, the repair procedure waits at block 1201 (while the distribution process continues as described above).

If, during the distribution process, a node $N_i^j$ is detected in block 1201 as failed, operation advances to block 1202 whereat a determination is made as to whether the failed node $N_i^j$ is an initial node. That is, a determination is made as to whether node $N_i^j$ is node $N_i^1$ of group $\hat{G}_1$ of primary multicast tree $\hat{M}$ in the example of FIG. 4. If node $N_i^j$ is an initial node, then operation advances to block 1203 where a determination is made as to whether the failed node $N_i^1$ is currently responsible for performing a group communication step of the ALM-FastReplica algorithm to group $G_1^1$ of secondary multicast tree $M^1$ in the example of FIG. 4. If the failed node $N_i^1$ is currently responsible for performing such a group communication to group $G_1^1$ of secondary multicast tree $M^1$, operation advances to block 1204 whereat origin node $N_0$ is notified of node $N_i^1$'s failure. That is, as described above, node $N_i^1$ begins to perform group communication to group $G_1^1$ of secondary multicast tree $M^1$ after it has fully received subfile $F_i$ and has terminated its communication connection with origin node $N_0$. Thus, origin node $N_0$ may be unaware of node $N_i^1$'s failure, and through exchanging heartbeat messages another node in group $\hat{G}_1$ may detect node $N_i^1$'s failure and notify origin node $N_0$. In certain embodiments, heartbeat messages may be sent from recipient nodes $\{N_1^1, \ldots, N_k^1\}$ of group $\hat{G}_1$ to origin node $N_0$ until completion of the file distribution (or at least until completion of the portion of the distribution process involving group $\hat{G}_1$), and such heartbeat messages may enable origin node $N_0$ to detect a failure of a node in group $\hat{G}_1$.

In operational block 1205, origin node $N_0$ triggers its buddy node $\hat{N}_0$ to establish a communication connection to node $N_i^1$ of group $G_1^1$ of secondary multicast tree $M^1$, and buddy node $\hat{N}_0$ communicates subfile $F_i$ to such node $N_i^1$ of group $G_1^1$. That is, buddy node $\hat{N}_0$ effectively substitutes for failed node $N_i^1$ of group $\hat{G}_1$ to communicate subfile $F_i$ to node $G_1^1$ of secondary multicast tree $M^1$. In alternative embodiments, origin node $N_0$ may itself substitute for failed node $N_i^1$ of group $\hat{G}_1$ to communicate subfile $F_i$ to node $G_1^1$ of secondary multicast tree $M^1$.

If in block 1203 it is determined that the failed node $N_i^1$ is not currently responsible for performing group communication to group $G_1^1$ of secondary multicast tree $M^1$, then operation advances to block 1206. At block 1206 buddy node $\hat{N}_0$ establishes a communication connection with the non-failed nodes of group $\hat{G}_1$. Operation then advances to block 1207 whereat buddy node $\hat{N}_0$ communicates subfile $F_i$ to whatever nodes of groups $\hat{G}_1$ and $\hat{G}_2$ to which subfile $F_i$ has not yet been fully distributed. For instance, buddy node $\hat{N}_0$ may communicate subfile $F_i$ to the non-failed nodes of group $\hat{G}_1$ that have not yet received subfile $F_i$. Further, if failed node $N_i^1$ is responsible for performing group communication to group $\hat{G}_2$ of primary multicast tree $\hat{M}$, buddy node $\hat{N}_0$ may establish a communication connection with node $N_i^2$ of such group $\hat{G}_2$ and communicates subfile $F_i$ thereto in block 1208.

If it is determined in block 1202 that the failed node $N_1^j$ is not an initial node (and is therefore a subsequent node), operation advances (via connector "A") to block 1209 shown in FIG. 12B. In block 1209, node $N_i^{j-1}$ detects that node $N_i^j$ has failed (e.g., through a failed communication attempt therewith or through notification from a node in the heartbeat group with node $N_i^j$). In block 1210, node $N_i^{j-1}$ informs the rest of the nodes in group $G_{j-1}$ of node $N_i^j$'s failure. In block 1211, the nodes of group $G_{j-1}$ share the additional load of communicating subfile $F_i$ to the nodes of group $G_j$, as shown in FIG. 11B. For instance, each of the nodes of group $G_{j-1}$ communicate subfile $F_i$ to a corresponding node of group $G_j$, as shown in FIG. 11B. Additionally, if failed node $N_i^j$ is responsible for performing group communication to a next group $G_{j+1}$, node $N_i^{j-1}$ communicates subfile $F_i$ to node $N_i^{j+1}$ of such next group $G_{j+1}$ in operational block 1212. That is, node $N_i^{j-1}$ effectively substitutes for failed node $N_i^j$ to communicate subfile $F_i$ to the corresponding node $N_i^{j+1}$ of the next group (group $G_{j+1}$ in this example).

While FIGS. 12A-12B show one example of a repair process that enables reliable distribution of file F accounting for failed recipient nodes, various other repair procedures may be utilized in accordance with the distribution techniques described herein, and any such repair procedures are intended to be within the scope of the present invention.

As one example application of embodiments of the present invention, consider the distribution of streaming media files within a CDN. In order to improve streaming media quality, the latest work in this direction proposes to stream video from multiple edge servers (or mirror sites), and in particular, by combining the benefits of multiple description coding (MDC) with Internet path diversity. MDC codes a media stream into multiple complementary descriptions. These descriptions have the property that if either description is received it can be used to decode the baseline quality video, and multiple descriptions can be used to decode improved quality video.

Thus, for a media file encoded with MDC, different descriptions can be treated as subfiles, and a distribution technique, such as the above-described ALM-FastReplica technique, can be applied to replicate them. That is, while the above examples describe partitioning a file into subfiles based, for example, on the number k of concurrent communication connections that can be supported by a node, in certain embodiments the distribution technique may be utilized with a file F encoded with multiple descriptions, wherein each of the multiple descriptions may be distributed to recipient nodes in the manner in which the above-described subfiles of a file F are described as being distributed.

Taking into account the nature of MDC (i.e., that either description received by the recipient node can be used to decode the baseline quality video), the reliability of the ALM-FastReplica algorithm may be improved. For instance, when using primary and secondary multicast trees as described above in FIG. 4 for distributing a media file encoded with MDC, even if failed nodes exist in the primary and/or secondary multicast trees, this ALM-FastReplica technique may provide a suitable distribution technique because receipt by nodes below the failed node(s) in the distribution tree of a portion of the descriptions (from the working nodes of the higher level) will be enough to decode the good quality video.

Various elements for performing the above-described file distribution and repair functions of embodiments of the present invention may be implemented in software, hardware, firmware, or a combination thereof. For example, software may be used on an origin node $N_0$ for determining logical groupings of recipient nodes and/or for partitioning file F into the appropriate number of subfiles. As another example, network interfaces may be used to concurrently communicate sub files from an origin node to recipient nodes of a distribution group (e.g., in the distribution step of ALM-FastReplica), as well as for communication of such subfiles between recipient nodes of the distribution group (e.g., in the collection step of ALM-FastReplica).

When implemented via computer-executable instructions, various elements of embodiments of the present invention for distributing file F from an origin node to recipient nodes are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

What is claimed is:

1. A method of distributing a file from a first node to a plurality of recipient nodes, the method comprising:
    partitioning a file F into a plurality of subfiles;
    performing distribution of said file F to a plurality of recipient nodes using a distribution technique that comprises
    (a) attempting to distribute the plurality of subfiles from a first node to a first group of recipient nodes, wherein the first node attempts to communicate at least one subfile to each recipient node of said first group but not all of said plurality of subfiles to any recipient node of said first group, and
    (b) said plurality of recipient nodes of said first group attempting to exchange the respective subfiles received from said first node, wherein at least one recipient node of said first group begins communicating a portion of a given subfile of the respective subfiles that said at least one recipient is receiving from the first node to at least one other recipient node of said first group before said at least one recipient node fully receives the given subfile;
    detecting a failed node of said plurality of recipient nodes; and
    said distribution technique to distribute all of the subfiles of said file F to each non-failed node of said plurality of recipient nodes.

2. The method of claim 1 wherein said distribution technique adapting responsive to said detecting a failed node.

3. The method of claim 1 wherein said attempting to distribute the plurality of subfiles from a first node to a first group of recipient nodes comprises:
    attempting to distribute a different subfile from said first node to each of said recipient nodes of said first group.

4. The method of claim 1 wherein said attempting to distribute the plurality of subfiles from a first node to a first group of recipient nodes comprises:
    attempting to distribute the plurality of subfiles from said first node to said plurality of recipient nodes of said first group concurrently.

5. The method of claim 1 wherein said plurality of recipient nodes of said first group attempting to exchange their respective subfiles further comprises:
    each of said plurality of recipient nodes attempting to establishing concurrent communication connections to every other recipient node of said first group.

6. The method of claim 1 wherein said detecting a failed node comprises said first node detecting a failed node in said first group such that said-first node is unable to communicate a particular subfile to such failed node.

7. The method of claim 6 wherein said attempting to distribute the plurality of subfiles from a first node to a first group of recipient nodes comprises said first node attempting to establish concurrent communication connections to the recipient nodes of said first group, and wherein said distribution technique comprises:
   responsive to said first node detecting a failed node in said first group such that said first node is unable to communicate a particular subfile to such failed node, said first node using established concurrent communication connections with non-failed nodes of said first group to communicate the particular subfile to said non-failed nodes.

8. The method of claim 6 wherein said attempting to distribute the plurality of subfiles from a first node to a first group of recipient nodes comprises said first node attempting to establish concurrent communication connections to the recipient nodes of said first group, and wherein said distribution technique comprises:
   responsive to said first node detecting a failed node in said first group such that said first node is unable to communicate a particular subfile to such failed node, said first node triggering a mirror node to establish concurrent communication connections with non-failed nodes of said first group to communicate the particular subfile to said non-failed nodes.

9. The method of claim 1 wherein said detecting a failed node comprises:
   said recipient nodes of said first group exchanging heartbeat messages; at least one recipient node of said first group detecting a failed node from analysis of heartbeat messages received; and
   said at least one recipient node of said first group notifying said first node of said detected failed node.

10. The method of claim 1 wherein said detecting a failed node comprises:
    said non-failed recipient nodes of said first group sending heartbeat messages to said first node; and
    said first node detecting a failed node from analysis of received heartbeat messages from said non-failed recipient nodes.

11. The method of claim 1 further comprising:
    said first group of recipient nodes attempting to communicate said file F to a second group comprising a plurality of recipient nodes.

12. The method of claim 1 further comprising:
    each recipient node of said first group attempting to communicate a subfile to at least one recipient node of said second group.

13. The method of claim 12 further comprising:
    each recipient node of said first group attempting to communicate the subfile that said each recipient node received from said first node to a corresponding node of the second group.

14. The method of claim 12 wherein said detecting a failed node comprises detecting a failed node in said first group when said failed node of said first group is attempting to communicate a subfile to said at least one recipient node of said second group.

15. The method of claim 14 wherein said distribution technique further comprises:
    said first node communicating said subfile to said at least one recipient node of said second group.

16. The method of claim 14 wherein said distribution technique further comprises:
    said first node triggering a mirror node to communicate the subfile to said at least one recipient node of said second group.

17. A system comprising:
    an origin node comprising a processor to partition a file F into a plurality of sub files, wherein said plurality of subfiles correspond in number to a number of recipient nodes in a first group to which said file is to be distributed;
    said origin node to attempt to distribute all of said plurality of sub files to said recipient nodes, wherein said origin node attempts to distribute a different one of said plurality of subfiles to each of said recipient nodes;
    said recipient nodes to attempt to exchange their respective subfiles received from said origin node such that each recipient node obtains all of said plurality of subfiles, wherein at least one recipient node of said first group begins communicating a portion of a given subfile of said respective subfiles that said at least one recipient node is receiving from the origin node to at least one other recipient node of said first group before said at least one recipient node fully receives the given respective subfile from the origin node;
    said origin node to detect a failed node in said first group; and
    said origin node to manage distribution of said file F upon detecting a failed node in said first group in a manner such that every non-failed node of said first group receives said file F.

18. The system of claim 17 wherein each of said recipient nodes attempt to distribute a subfile being received from said origin node to the others of said recipient nodes of said first group.

19. The system of claim 17 wherein said origin node is operable to attempt to distribute the plurality of subfiles to said plurality of recipient nodes of said first group concurrently.

20. The system of claim 17 wherein said origin node trigger a mirror node to establish concurrent communication connections with non-failed nodes of said first group to communicate a subfile to said non-failed nodes.

21. A method of distributing a file from a first node to a plurality of recipient nodes, the method comprising:
    attempting to distribute a plurality of subfiles that comprise a file F from a first node to a first group comprising a plurality of recipient nodes, wherein the first node attempts to distribute at least one subfile to each recipient node of said first group but not all of said plurality of subfiles are distributed from the first node to any of the recipient nodes of said first group;
    said plurality of recipient nodes of said first group attempting to exchange their respective sub files, wherein at least one recipient node of said first group begins communicating a portion of given respective subfile of the respective subfiles that said at least one recipient node is receiving from the first node to at least one other recipient node of said first group before said at least one recipient node fully receives the given respective subfile;
    detecting whether one of said plurality of recipient nodes of said first group has failed; and
    if a recipient node of said first group has failed, managing the distribution of the plurality of subfiles to detour their distribution around the failed node such that the file F is distributed to each non-failed node of said plurality of recipient nodes.

22. The method of claim 21 wherein said attempting to distribute the plurality of subfiles from a first node to a first group of recipient nodes comprises:
attempting to distribute a different subfile from said first node to each of said recipient nodes of said first group.

23. The method of claim 22 wherein said managing the distribution of the plurality of subfiles to detour their distribution around the failed node such that file F is distributed to each non-failed node of said plurality of recipient nodes comprises:
said first node communicating to non-failed nodes of said first group a subfile that the first node would communicate to the failed node if the failed node were not failed.

24. The method of claim 22 wherein said managing the distribution of the plurality of subfiles to detour their distribution around the failed node such that file F is distributed to each non-failed node of said plurality of recipient nodes comprises:
said first node triggering a mirror node to communicate to non-failed nodes of said first group a subfile that the first node would communicate to the failed node if the failed node were not failed.

25. The method of claim 21 wherein said attempting to distribute the plurality of subfiles from a first node to a first group of recipient nodes comprises:
attempting to distribute the plurality of subfiles from said first node to said plurality of recipient nodes of said first group concurrently.

26. The method of claim 21 wherein said plurality of recipient nodes of said first group attempting to exchange their respective subfiles further comprises:
each of said plurality of recipient nodes attempting to establishing concurrent communication connections to every other recipient node of said first group.

27. The method of claim 21 wherein said detecting whether one of said plurality of recipient nodes of said first group has failed comprises:
said recipient nodes of said first group exchanging heartbeat messages;
at least one recipient node of said first group detecting a failed node from analysis of heartbeat messages received; and
said at least one recipient node of said first group notifying said first node of said detected failed node.

28. The method of claim 21 wherein said detecting whether one of said plurality of recipient nodes of said first group has failed comprises:
the non-failed recipient nodes of said first group sending heartbeat messages to said first node; and
said first node detecting a failed node from analysis of received heartbeat messages from the non-failed recipient nodes.

* * * * *

UNITED STATES PATENT AND TRADEMARK OFFICE
CERTIFICATE OF CORRECTION

PATENT NO. : 7,523,217 B2  Page 1 of 1
APPLICATION NO. : 10/619737
DATED : April 21, 2009
INVENTOR(S) : Ludmila Cherkasova It is certified that error appears in the above-identified patent and that said Letters Patent is hereby corrected as shown below:

In column 9, line 31, delete "$N_i$" and insert -- $N_1$ --, therefor.

In column 19, line 62, delete "file P" and insert -- file F --, therefor.

Signed and Sealed this

Fifteenth Day of September, 2009

David J. Kappos
*Director of the United States Patent and Trademark Office*